(12) United States Patent
Lyu et al.

(10) Patent No.: US 11,719,913 B2
(45) Date of Patent: Aug. 8, 2023

(54) OPTICAL IMAGING SYSTEM INCLUDING SEVEN LENSES OF ++-+-+-, - +-+-+-, ++---+- OR ++-+++- REFRACTIVE POWERS

(71) Applicant: Zhejiang Sunny Optical Co., Ltd, Zhejiang (CN)

(72) Inventors: Saifeng Lyu, Zhejiang (CN); Mengna Tang, Zhejiang (CN); Fujian Dai, Zhejiang (CN); Liefeng Zhao, Zhejiang (CN)

(73) Assignee: ZHEJIANG SUNNY OPTICAL CO., LTD., Zhejiang Province (CN)

( * ) Notice: Subject to any disclaimer, the term of this patent is extended or adjusted under 35 U.S.C. 154(b) by 297 days.

(21) Appl. No.: 16/990,425

(22) Filed: Aug. 11, 2020

(65) Prior Publication Data

US 2021/0063698 A1 Mar. 4, 2021

(30) Foreign Application Priority Data

Aug. 28, 2019 (CN) .......................... 201910803288.9

(51) Int. Cl.
*G02B 13/00* (2006.01)
*G02B 9/64* (2006.01)
*G02B 13/06* (2006.01)

(52) U.S. Cl.
CPC ........... *G02B 13/0045* (2013.01); *G02B 9/64* (2013.01); *G02B 13/06* (2013.01)

(58) Field of Classification Search
CPC .............................. G02B 13/0045; G02B 9/64
See application file for complete search history.

(56) References Cited

U.S. PATENT DOCUMENTS

| 11,314,059 | B2* | 4/2022 | Bian | G02B 13/0045 |
| 2019/0346663 | A1* | 11/2019 | Tang | G02B 9/64 |
| 2019/0369359 | A1* | 12/2019 | Son | G02B 13/0045 |
| 2019/0369366 | A1* | 12/2019 | Baik | G02B 7/021 |
| 2020/0201002 | A1 | 6/2020 | Xu et al. | |
| 2020/0393653 | A1* | 12/2020 | Chen | G02B 13/0045 |
| 2022/0155562 | A1* | 5/2022 | Zhang | H04N 5/2254 |

FOREIGN PATENT DOCUMENTS

| CN | 107436481 A | 12/2017 |
| CN | 107703609 A | 2/2018 |
| CN | 107831588 B | 11/2018 |

OTHER PUBLICATIONS

Indian First Examination Report dated Jun. 1, 2021, in connection with Indian Application No. 202014034791.

* cited by examiner

*Primary Examiner* — Wen Huang
(74) *Attorney, Agent, or Firm* — Norris McLaughlin, P.A.

(57) ABSTRACT

The present disclosure discloses an optical imaging system including, sequentially from an object side to an image side along an optical axis, a first lens having refractive power with a convex object-side surface; a second lens having positive refractive power; a third lens having refractive power; a fourth lens having refractive power; a fifth lens having refractive power; a sixth lens having positive refractive power with a convex image-side surface; and a seventh lens having negative refractive power. An effective focal length f of the optical imaging system and a maximum field-of-view FOV of the optical imaging system satisfy f*tan(FOV/2)>4.0 mm. The effective focal length f of the optical imaging system and a radius of curvature R9 of an object-side surface of the fifth lens satisfy 0<f/R9<1.0.

17 Claims, 11 Drawing Sheets

OPTICAL IMAGING SYSTEM INCLUDING SEVEN LENSES OF ++-+-+-, - +-+-+-, ++---+- OR ++-+++- REFRACTIVE POWERS

CROSS-REFERENCE TO RELATED APPLICATION

This application claims benefit of priority to Chinese Patent Application No. 201910803288.9 filed on Aug. 28, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including seven lenses.

BACKGROUND

With the upgrading of consumer electronic products represented by mobile phones and the development of functions of image software and video software running on consumer electronic products, the market demands for optical imaging systems suitable for portable electronic products have gradually increased.

Mobile phones have poor image quality at night or in dark environments. Therefore the market expects mobile phones with a better night shooting effect. However, the size of portable devices, such as mobile phones, limits the size of the optical imaging system mounted thereon. In order to meet the requirements of miniaturization and imaging requirements, an optical imaging system that may simultaneously satisfy the characteristics of miniaturization as well as large image plane, large aperture, and high image quality is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens having refractive power, and an object-side surface thereof may be a convex surface; a second lens having positive refractive power; a third lens having refractive power; a fourth lens having refractive power; a fifth lens having refractive power; a sixth lens having positive refractive power, and an image-side surface thereof may be a convex surface; and a seventh lens having negative refractive power.

In one embodiment, an effective focal length f of the optical imaging system and a maximum field-of-view FOV of the optical imaging system may satisfy $f*\tan(FOV/2)>4.0$ mm.

In one embodiment, an effective focal length f of the optical imaging system and a radius of curvature R9 of an object-side surface of the fifth lens may satisfy $0<f/R9<1.0$.

In one embodiment, a radius of curvature R2 of an image-side surface of the first lens, a radius of curvature R3 of an object-side surface of the second lens and an effective focal length f of the optical imaging system may satisfy $10*|R2-R3|/f<0.5$.

In one embodiment, a spaced interval T12 between the first lens and the second lens along the optical axis, a center thickness CT1 of the first lens along the optical axis and a center thickness CT2 of the second lens along the optical axis may satisfy $T12/(CT2-CT1)\leq 0.2$.

In one embodiment, a spaced interval T12 between the first lens and the second lens along the optical axis, a center thickness CT1 of the first lens along the optical axis and a center thickness CT2 of the second lens along the optical axis may satisfy $0<T12/(CT2-CT1)\leq 0.2$.

In one embodiment, a spaced interval T45 between the fourth lens and the fifth lens along the optical axis, a spaced interval T56 between the fifth lens and the sixth lens along the optical axis and a spaced interval T67 between the sixth lens and the seventh lens along the optical axis may satisfy $1\leq |T45-T56|/|T56-T67|<4$.

In one embodiment, the optical imaging system satisfies $|T12-ET12|*10<1.0$ mm, where ET12 is an edge spaced interval between the first lens and the second lens and T12 is a spaced interval between the first lens and the second lens along the optical axis.

In one embodiment, ET12 is a distance from an image-side surface of the first lens to an object-side surface of the second lens, and is measured by projecting the edge point of a maximum effective radius of the image-side surface of the first lens to the object-side surface of the second lens in a direction parallel to the optical axis.

In one embodiment, a center thickness CT4 of the fourth lens along the optical axis, a center thickness CT5 of the fifth lens along the optical axis and a center thickness CT7 of the seventh lens along the optical axis may satisfy $0.4$ mm $\leq (CT4+CT5+CT7)/3<0.6$ mm.

In one embodiment, an effective focal length f of the optical imaging system and a combined focal length f12 of the first lens and the second lens may satisfy $1\leq f/f12<1.3$.

In one embodiment, an effective focal length f of the optical imaging system and an effective focal length f3 of the third lens may satisfy $-0.5\leq f/f3<0$.

In one embodiment, an effective focal length f of the optical imaging system, an effective focal length f4 of the fourth lens and an effective focal length f5 of the fifth lens may satisfy $|f/f4|+|f/f5|\leq 0.3$.

In one embodiment, an effective focal length f6 of the sixth lens and a center thickness CT6 of the sixth lens along the optical axis may satisfy $f6/CT6<5.0$.

In one embodiment, an effective focal length f of the optical imaging system and a radius of curvature R1 of the object-side surface of the first lens may satisfy $2<f/R1<3$.

In one embodiment, a radius of curvature R5 of an object-side surface of the third lens and a radius of curvature R6 of an image-side surface of the third lens may satisfy $1<R5/R6<2$.

In one embodiment, an effective focal length f of the optical imaging system, an entrance pupil diameter EPD of the optical imaging system and half of a diagonal length ImgH of an effective pixel area on an imaging plane of the optical imaging system may satisfy $f/(EPD*ImgH)<0.5$ mm$^{-1}$.

In one embodiment, the optical imaging system further includes a stop, and a distance SL along the optical axis from the stop to an imaging plane of the optical imaging system and a distance TTL along the optical axis from the object-side surface of the first lens to the imaging surface may satisfy $0.7<SL/TTL\leq 0.9$.

The present disclosure employs seven lenses, and the optical imaging system has at least one advantageous effect such as large image plane, large aperture, high image quality and miniaturization and the like by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
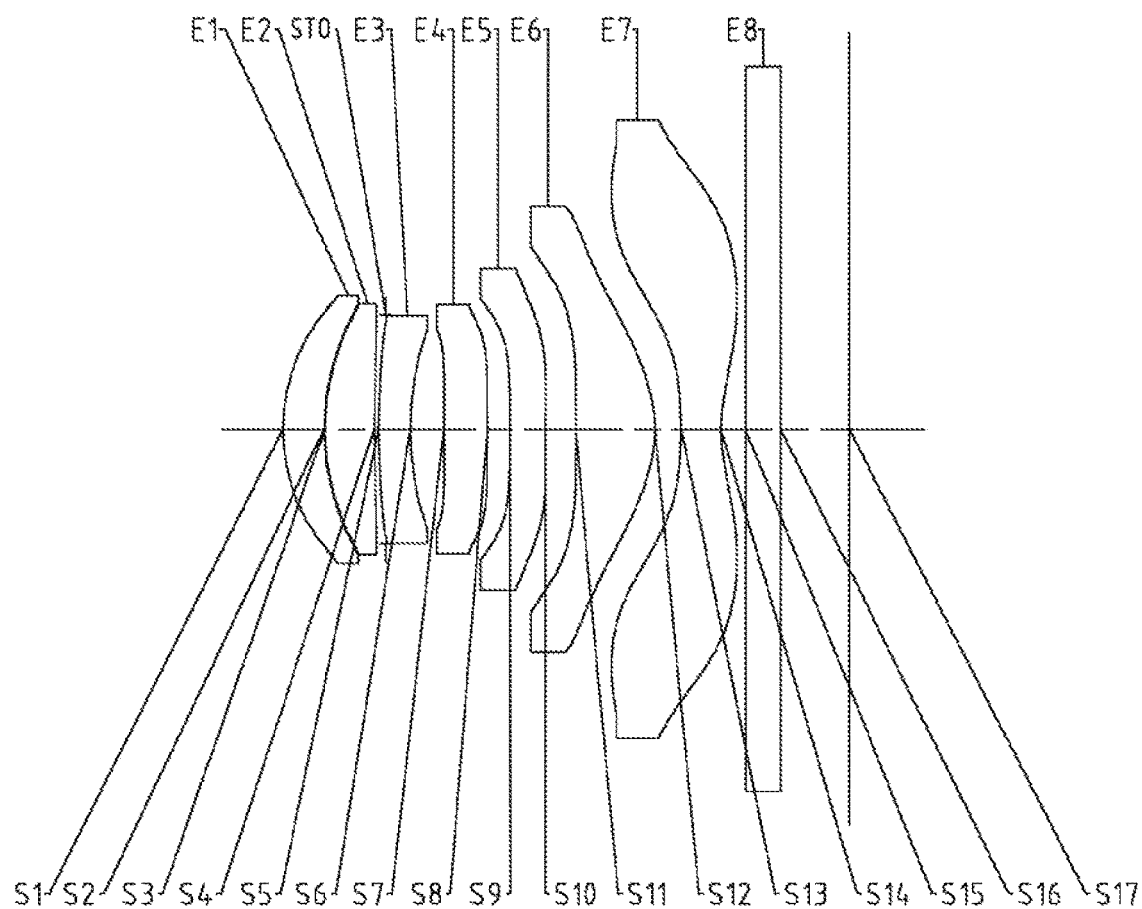
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens has positive or negative refractive power, and an object-side surface thereof may be a convex surface; the second lens may have positive refractive power; the third lens has positive or negative refractive power; the fourth lens has positive or negative refractive power; the fifth lens has positive or negative refractive power; the sixth lens may have positive refractive power, and an image-side surface thereof may be a convex surface; and the seventh lens may have negative refractive power. By reasonably controlling the positive and negative refractive power of each component of the system and the curvature of lenses' surface, the low-order aberration of the system may be effectively compensated.

In an exemplary embodiment, the optical imaging system according to the present disclosure may satisfy: $f*\tan(FOV/2)>4.0$ mm, where f is an effective focal length of the optical imaging system and FOV is a maximum field-of-view of the optical imaging system. More specifically, f and FOV may satisfy: $f*\tan(FOV/2)>4.5$ mm. Controlling the effective focal length and the maximum field-of-view of the optical imaging system is beneficial to enable the optical imaging system to have a larger image plane, thereby enabling the optical imaging system of the present disclosure to obtain more image information when shooting. In addition, it is beneficial to make the optical imaging system perform better in collecting details, and significantly improve the imaging quality of the optical imaging system under a dark shooting environment.

In an exemplary embodiment, the optical imaging system according to the present disclosure may satisfy: $0<f/R9<1.0$, where f is an effective focal length of the optical imaging system and R9 is a radius of curvature of an object-side surface of the fifth lens. More specifically, f and R9 may satisfy: $0.21<f/R9<0.88$. By controlling the ratio of the effective focal length of the optical imaging system to the radius of curvature of the object-side surface of the fifth lens, it is beneficial to miniaturize the optical imaging system, and correct the aberrations of the optical imaging system. In addition, it is also beneficial to even the aperture difference among lenses, thereby enabling the optical imaging system to have good assembly stability and make the assembly process stable.

In an exemplary embodiment, the optical imaging system according to the present disclosure may satisfy: $10*|R2-R3|/f<0.5$, where R2 is a radius of curvature of an image-side surface of the first lens, R3 is a radius of curvature of an object-side surface of the second lens and f is an effective focal length of the optical imaging system. More specifically, R2, R3 and f may satisfy: $0\leq 10*|R2-R3|/f<0.35$. By controlling the ratio of the difference in curvature between the image-side surface of the first lens and the object-side surface of the second lens to the effective focal length of the optical imaging system, it is beneficial to make the first lens and the second lens have a better ability to converge the light while reducing the deflection angle of the light, and avoid the surface inclination of the first lens and the second lens from being too large, thereby making the first lens and the second lens may have a good processing and molding process. In addition, the sensitivity of the optical imaging system is advantageously reduced, and the optical imaging system has a larger aperture.

In an exemplary embodiment, the optical imaging system according to the present disclosure may satisfy: $T12/(CT2-CT1)\leq 0.2$, where T12 is a spaced interval between the first lens and the second lens along the optical axis, CT1 is a center thickness of the first lens along the optical axis and CT2 is a center thickness of the second lens along the optical axis. By controlling the air interval between the first lens and the second lens and their respective center thicknesses, the intensity of ghost images generated by the first lens and the second lens may be effectively reduced. Also, it is beneficial to improve the imaging quality of the optical imaging system. In addition, the thicknesses of the first lens and the second lens may be uniform, which is beneficial for the optical imaging system to have good assembly stability.

In an exemplary embodiment, T12, CT1 and CT2 may satisfy: $0<T12/(CT2-CT1)\leq 0.2$. More specifically, T12, CT1 and CT2 may satisfy: $0.08<T12/(CT2-CT1)\leq 0.18$. By setting the second lens to be thicker than the first lens, the total optical length of the optical imaging system may be effectively reduced, and the astigmatic contributed by the first lens and the second lens may be reduced.

In an exemplary embodiment, the optical imaging system according to the present disclosure may satisfy: $1\leq |T45-T56|/|T56-T67|<4$, where T45 is a spaced interval between the fourth lens and the fifth lens along the optical axis, T56 is a spaced interval between the fifth lens and the sixth lens along the optical axis and T67 is a spaced interval between the sixth lens and the seventh lens along the optical axis. More specifically, T45, T56 and T67 may satisfy: $1.05\leq |T45-T56|/|T56-T67|<3.9$. By controlling the air interval between adjacent lenses of the fourth lens to the seventh lens, it is beneficial to improve the workability of each lens and make the optical imaging system easier to assemble, avoid the interference of adjacent lenses when assembling the optical imaging system. At the same time, it is beneficial to slow down the deflection of light from the fourth lens to the seventh lens, adjust the field curvature of the optical imaging system, and reduce the sensitivity of the optical imaging system, thereby improving the imaging quality of the optical imaging system.

In an exemplary embodiment, the optical imaging system according to the present disclosure may satisfy: $|T12-ET12|*10<1.0$ mm, where ET12 is an edge spaced interval between the first lens and the second lens, and T12 is a spaced interval between the first lens and the second lens along the optical axis. More specifically, T12 and ET12 may satisfy: $|T12-ET12|*10<0.9$ mm. Controlling the edge spaced interval and the on-axis distance between the first lens and the second lens is beneficial to improve the assembly performance of the first lens and the second lens, thereby avoiding the interference of the first lens and the second lens during assembly. At the same time, it is beneficial to reduce the intensity of ghost images generated by the first lens and the second lens, thereby improving the imaging quality of the optical imaging system.

As an example, where the maximum effective radius of the image-side surface of the first lens is greater than the maximum effective radius of the object-side surface of the second lens, the edge spaced interval ET12 is the spaced interval parallel to the optical axis between the first lens and the second lens at the maximum effective radius of the image-side surface of the first lens. Where the maximum effective radius of the object-side surface of the second lens is greater than the maximum effective radius of the image-side surface of the first lens, the edge spaced interval ET12 is the spaced interval parallel to the optical axis between the first lens and the second lens at the maximum effective radius of the object-side surface of the second lens. Where the maximum effective radius of the image-side surface of the first lens is equal to the maximum effective radius of the object-side surface of the second lens, the edge spaced interval ET12 is the spaced interval parallel to the optical axis between the first lens and the second lens at the maximum effective radius of any one of the image-side surface of the first lens and the object-side surface of the second lens. As an example, where the maximum effective radius of the image-side surface of the first lens is greater than the maximum effective radius of the object-side surface of the second lens and even greater than the maximum radius of the object-side surface of the second lens, the edge spaced interval ET12 is the spaced interval parallel to the optical axis between the first lens and the second lens at the maximum radius of the object-side surface of the second lens.

In an exemplary embodiment, the optical imaging system according to the present disclosure may satisfy: 0.4 mm≤(CT4+CT5+CT7)/3<0.6 mm, where CT4 is a center thickness of the fourth lens along the optical axis, CT5 is a center thickness of the fifth lens along the optical axis, and CT7 is a center thickness of the seventh lens along the optical axis. More specifically, CT4, CT5 and CT7 may satisfy: 0.44 mm≤(CT4+CT5+CT7)/3<0.51 mm. By controlling the center thickness of the fourth lens, the center thickness of the fifth lens and the center thickness of the seventh lens, it is beneficial to improve the processing manufacturability of each lens. On the one hand, each lens is not too thin, which is easy to manufacture and mold the lens and has good assembly stability. On the other hand, each lens is not too thick, and the internal stress of each lens is small. In addition, the ghost image intensity brought by the fourth lens to the seventh lens to the optical imaging system is also advantageously reduced.

In an exemplary embodiment, the optical imaging system according to the present disclosure may satisfy: 1≤f/f12<1.3, where f is an effective focal length of the optical imaging system and f12 is a combined focal length of the first lens and the second lens. More specifically, f and f12 may satisfy: 1.02≤f/f12<1.20. By controlling the ratio of the effective focal length of the optical imaging system to the combined focal length of the first lens and the second lens, it is beneficial to reduce the sensitivity of the first lens and the second lens, so that the first lens and the second lens may have a looser tolerance, thereby improving the processing manufacturability. At the same time, it is also beneficial to offset the astigmatic and coma caused by the first lens with the astigmatic and coma caused by the second lens, thereby improving the imaging quality of the optical imaging system and making the optical imaging system have better resolution.

In an exemplary embodiment, the optical imaging system according to the present disclosure may satisfy: −0.5≤f/f3<0, where f is an effective focal length of the optical imaging system and f3 is an effective focal length of the third lens. More specifically, f and f3 may satisfy: −0.48≤f/f3<−0.32. By controlling the ratio of the effective focal length of the optical imaging system to the effective focal length of the third lens, it is beneficial to better eliminate the spherical aberration and astigmatic of the optical imaging system on the one hand, and it is beneficial to control the trend of light in the optical imaging system, so as to prevent the light from being too excessive tilt, thereby reducing the sensitivity of the optical imaging system, on the other hand.

In an exemplary embodiment, the optical imaging system according to the present disclosure may satisfy: |f/f4|+|f/f5|≤0.3, where f is an effective focal length of the optical imaging system, f4 is an effective focal length of the fourth lens and f5 is an effective focal length of the fifth lens. More specifically, f, f4 and f5 may satisfy: |f/f4|+|f/f5|≤0.28. Controlling the effective focal length of the fourth lens and the effective focal length of the fifth lens is beneficial to make the optical imaging system have a shorter size in the optical axis direction, thereby achieving the miniaturization and ultra-thin characteristics of the optical imaging system. At the same time, the optical imaging system has a balanced refractive power distribution. In addition, using with the first lens to the third lens is beneficial to correct the aberration of the optical imaging system.

In an exemplary embodiment, the optical imaging system according to the present disclosure may satisfy f6/CT6<5.0, where f6 is an effective focal length of the sixth lens and CT6 is a center thickness of the sixth lens along the optical axis. More specifically, f6 and CT6 may satisfy: 2.9<f6/CT6<4.4. By controlling the ratio of the effective focal length of the sixth lens to the center thickness of the sixth lens, it is beneficial to better converge the light at the sixth lens on the one hand, thereby enabling the optical imaging system to have a larger imaging plane. On the other hand, it is also beneficial to control the thickness of the sixth lens, avoid the concentration of refractive power caused by the excessive thickness of the sixth lens, and correct the aberration of the optical imaging system.

In an exemplary embodiment, the optical imaging system according to the present disclosure may satisfy: 2<f/R1<3, where f is an effective focal length of the optical imaging system and R1 is a radius of curvature of the object-side surface of the first lens. More specifically, f and R1 may satisfy: 2.1<f/R1<2.6. By controlling the ratio of the effective focal length of the optical imaging system to the radius of curvature of the object-side surface of the first lens, it is beneficial to slow down the deflection of the light at the first lens, thereby reducing the sensitivity of the first lens. Also, it is beneficial to reduce the spherical aberration generated by the first lens.

In an exemplary embodiment, the optical imaging system according to the present disclosure may satisfy: 1<R5/R6<2, where R5 is a radius of curvature of an object-side surface of the third lens, and R6 is a radius of curvature of an image-side surface of the third lens. More specifically, R5 and R6 may satisfy: 1.38<R5/R6<1.93. Controlling the ratio of the radius of curvature of the surfaces on both sides of the third lens is beneficial to reduce the length from the first lens to the third lens along the optical axis, and evenly distribute the refractive power of the optical imaging system to avoid the refractive power concentrating on the third lens. In addition, the aberration of the third lens on the object side is also advantageously corrected, thereby improving the imaging quality of the optical imaging system.

In an exemplary embodiment, the optical imaging system according to the present disclosure may satisfy: f/(EPD*ImgH)<0.5 mm$^{-1}$, where f is an effective focal length of the optical imaging system, EPD is an entrance pupil diameter of the optical imaging system, and ImgH is half of a diagonal length of an effective pixel area on an imaging plane of the optical imaging system. More specifically, f, EPD and ImgH may satisfy: 0.3 mm$^{-1}$<f/(EPD*ImgH)<0.4 mm$^{-1}$. By controlling the effective focal length, entrance pupil diameter, and image height of the optical imaging system, the optical imaging system may have a larger imaging plane while have a large aperture, which is beneficial to increase the relative illuminance, the resolution and the light flux of the optical imaging system, so that the optical imaging system may obtain more image information. The optical imaging system has a good imaging ability even when operating in a dark environment.

In an exemplary embodiment, the optical imaging system described above may include at least one stop. The stop may be disposed at an appropriate position as needed, for example, between the second lens and the third lens. In an exemplary embodiment, the optical imaging system may satisfy: 0.7<SL/TTL≤0.9, where SL is a distance along the optical axis from the stop to an imaging plane of the optical imaging system, and TTL is a distance along the optical axis from the object-side surface of the first lens to the imaging surface. More specifically, SL and TTL may satisfy: 0.79<SL/TTL≤0.89. By setting the position of the stop, on the one hand, it is beneficial to better match the chief ray angle (CRA) of the optical imaging system with the photosensitive chip. On the other hand, it is beneficial to shorten the total optical length of the optical imaging system, and miniaturize the optical imaging system. Optionally, the above optical imaging system may further include an optical filter for correcting the color deviation and/or a protective glass for protecting the photosensitive element located on the imaging plane.

The optical imaging system according to the above embodiments of the present disclosure may employ a plurality of lenses, such as seven lenses as described above. By properly assigning the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as large image plane, large aperture, high imaging quality, and miniaturization.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the third lens to the seventh lens are aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure. As shown in FIG. 1, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 2.2411 | 0.5064 | 1.546 | 56.11 | 13.14 | 0.0112 |
| S2 | Spherical | 3.0000 | 0.0100 | | | | 0.0000 |
| S3 | Spherical | 3.0000 | 0.6000 | 1.546 | 56.11 | 7.09 | 0.0000 |
| S4 | Aspheric | 12.4218 | 0.1406 | | | | 8.2007 |
| STO | Spherical | Infinite | −0.0883 | | | | |
| S5 | Aspheric | 6.8039 | 0.3846 | 1.666 | 20.40 | −11.84 | −1.4620 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | 3.5718 | 0.4073 | | | | −0.6934 |
| S7 | Aspheric | 24.3871 | 0.5277 | 1.546 | 56.11 | 143.32 | 1.7261 |
| S8 | Aspheric | 35.1612 | 0.2765 | | | | 2.0653 |
| S9 | Aspheric | 24.0415 | 0.4276 | 1.666 | 20.40 | −43.52 | 98.3956 |
| S10 | Aspheric | 13.0562 | 0.3704 | | | | −28.1672 |
| S11 | Aspheric | −480.1562 | 0.9668 | 1.546 | 56.11 | 3.11 | −99.0000 |
| S12 | Aspheric | −1.6925 | 0.3194 | | | | −8.6073 |
| S13 | Aspheric | −5.7813 | 0.4810 | 1.536 | 55.74 | −2.67 | −1.8131 |
| S14 | Aspheric | 1.9566 | 0.2986 | | | | −9.5292 |
| S15 | Spherical | Infinite | 0.4276 | 1.517 | 64.20 | | |
| S16 | Spherical | Infinite | 0.8338 | | | | |
| S17 | Spherical | Infinite | | | | | |

In example 1, an effective focal length f of the optical imaging system is 5.70 mm, and an on-axis distance TTL from the object-side surface S1 of the first lens E1 to the imaging plane S17 is 6.38 mm.

In example 1, the object-side surface S1 of the first lens E1, the image-side surface S4 of the second lens E2 and the object-side surface and the image-side surface of any one of the third lens E3 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 and S4 to S12 in example 1.

TABLE 2

| Surface number | A4 | A6 | A8 | A10 | A12 |
|---|---|---|---|---|---|
| S1 | 1.1880E−04 | −3.2058E−03 | 1.0434E−02 | −1.7481E−02 | 1.6931E−02 |
| S4 | −7.5869E−02 | 1.0831E−01 | −8.0657E−02 | 1.1581E−02 | 3.7771E−02 |
| S5 | −8.8668E−02 | 1.2203E−01 | −8.6584E−02 | 7.2487E−02 | 5.5008E−02 |
| S6 | −2.6692E−02 | 1.8996E−02 | 4.6871E−02 | −1.4180E−01 | 2.0022E−01 |
| S7 | −3.7405E−02 | 1.0099E−02 | 1.6160E−03 | −1.0979E−01 | 2.7881E−01 |
| S8 | −4.7487E−02 | 4.3494E−03 | 2.3907E−02 | −7.2394E−02 | 8.6360E−02 |
| S9 | −8.3706E−02 | 5.4778E−03 | 3.2938E−02 | −5.6108E−02 | 4.8074E−02 |
| S10 | −7.3530E−02 | 9.7250E−03 | −3.1779E−04 | 8.4417E−03 | −1.2687E−02 |
| S11 | −1.7252E−02 | −4.0167E−03 | −1.2859E−02 | 1.9155E−02 | −1.1993E−02 |
| S12 | −8.6210E−02 | 8.1244E−02 | −6.4602E−02 | 3.4073E−02 | −1.0969E−02 |
| S13 | −5.9232E−02 | 8.5919E−03 | 2.1359E−03 | −7.1448E−04 | 8.0370E−05 |
| S14 | −4.9059E−02 | 1.5789E−02 | −3.8720E−03 | 6.4611E−04 | −7.2126E−05 |

| Surface number | A14 | A16 | A18 | A20 |
|---|---|---|---|---|
| S1 | −9.9850E−03 | 3.5156E−03 | −6.8136E−04 | 5.5529E−05 |
| S4 | −3.9513E−02 | 1.8778E−02 | −4.5498E−03 | 4.5437E−04 |
| S5 | −5.9972E−02 | 3.1302E−02 | −8.4687E−03 | 9.5533E−04 |
| S6 | −1.7504E−01 | 9.8032E−02 | −3.2744E−02 | 5.0128E−03 |
| S7 | −3.5955E−01 | 2.5908E−01 | −9.9668E−02 | 1.6028E−02 |
| S8 | −6.2407E−02 | 2.8270E−02 | −7.4033E−03 | 8.6970E−04 |

TABLE 2-continued

| | | | | |
|---|---|---|---|---|
| S9 | −2.8177E−02 | 1.1398E−02 | −2.6923E−03 | 2.6761E−04 |
| S10 | 7.8228E−03 | −2.3898E−03 | 3.5988E−04 | −2.1409E−05 |
| S11 | 4.2183E−03 | −8.7369E−04 | 9.9717E−05 | −4.8205E−06 |
| S12 | 2.1619E−03 | −2.5631E−04 | 1.6836E−05 | −4.7166E−07 |
| S13 | −3.6031E−06 | −3.4961E−08 | 8.8293E−09 | −2.2678E−10 |
| S14 | 5.1375E−06 | −2.1558E−07 | 4.6461E−09 | −3.6703E−11 |

Figure 2A:
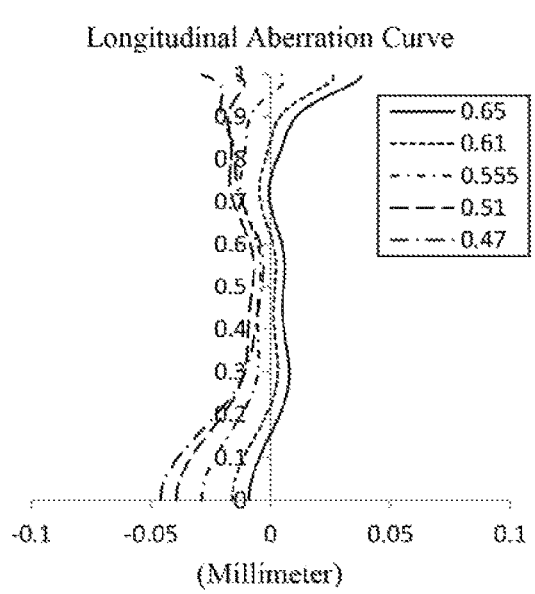
FIGS. 2A to 2D illustrate a longitudinal aberration curve, an astigmatic curve, a distortion curve, and a lateral color curve of the optical imaging system of the Example 1, respectively.
Figure 2B:
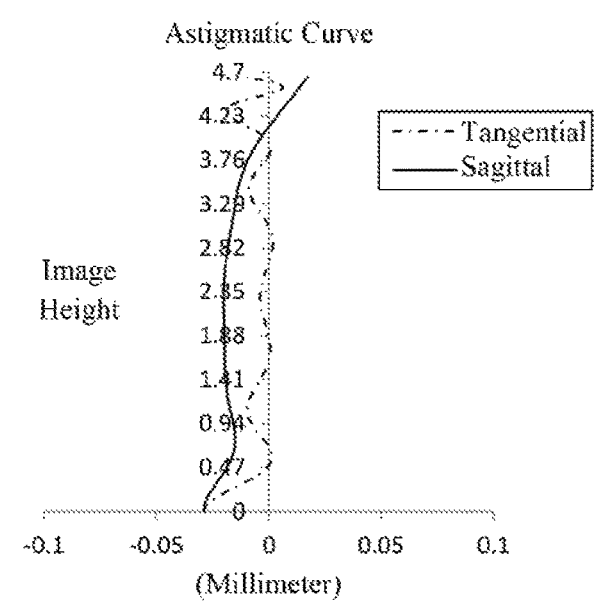
Figures 2C, 2D:
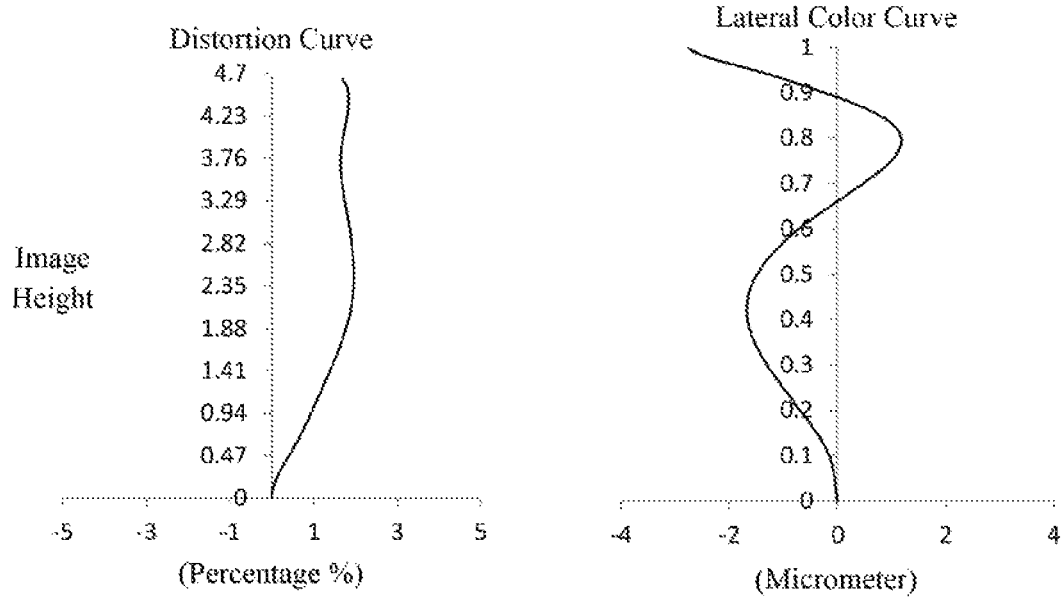

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different image heights. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve good image quality.

Example 2

Figure 3:
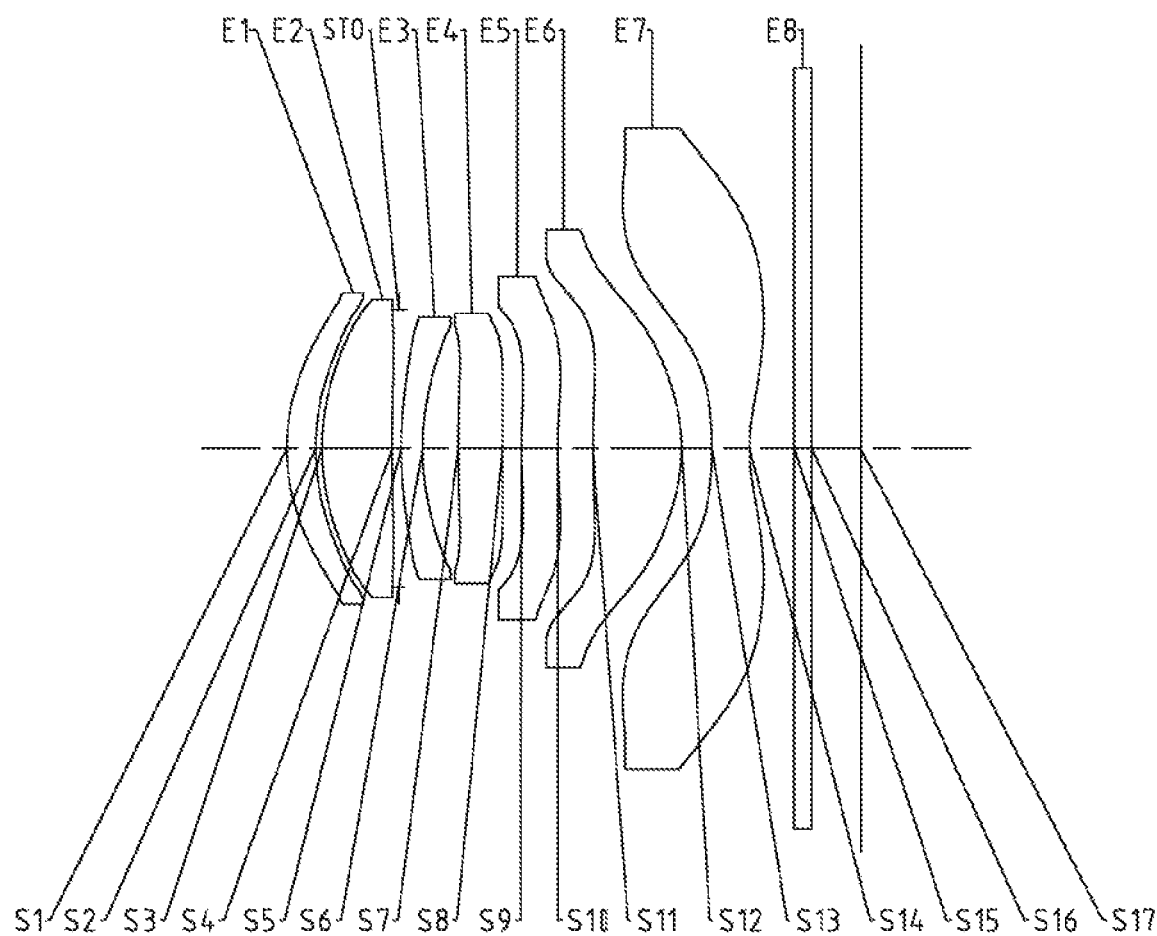
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure. As shown in FIG. 3, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 2, an effective focal length f of the optical imaging system is 5.40 mm, and an on-axis distance TTL from the object-side surface S1 of the first lens E1 to the imaging plane S17 is 6.87 mm.

Table 3 is a table illustrating the basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.4625 | 0.3455 | 1.546 | 56.11 | 29.41 | −0.4631 |
| S2 | Aspheric | 2.7645 | 0.0772 | | | | −0.6172 |
| S3 | Aspheric | 2.9420 | 0.8412 | 1.546 | 56.11 | 6.10 | −0.2041 |
| S4 | Aspheric | 22.7198 | 0.0750 | | | | −73.6543 |
| STO | Spherical | Infinite | 0.0308 | | | | |
| S5 | Aspheric | 4.7660 | 0.2569 | 1.678 | 19.25 | −13.88 | 5.4008 |
| S6 | Aspheric | 3.0938 | 0.4257 | | | | −0.6005 |
| S7 | Aspheric | 16.9963 | 0.5303 | 1.546 | 56.11 | 170.07 | 91.8043 |
| S8 | Aspheric | 20.5755 | 0.2241 | | | | 98.0256 |
| S9 | Aspheric | 6.1962 | 0.4384 | 1.666 | 20.40 | −72.05 | −50.6628 |
| S10 | Aspheric | 5.3328 | 0.4189 | | | | −20.6556 |
| S11 | Aspheric | 11.2107 | 1.0654 | 1.546 | 56.11 | 3.20 | −53.0042 |
| S12 | Aspheric | −1.9963 | 0.3608 | | | | −11.5701 |
| S13 | Aspheric | −5.0006 | 0.4500 | 1.536 | 55.74 | −2.80 | −1.1076 |
| S14 | Aspheric | 2.2209 | 0.5349 | | | | −10.0652 |
| S15 | Spherical | Infinite | 0.2100 | 1.517 | 64.20 | | |
| S16 | Spherical | Infinite | 0.5849 | | | | |
| S17 | Spherical | Infinite | | | | | |

TABLE 4

| Surface number | A4 | A6 | A8 | A10 | A12 |
|---|---|---|---|---|---|
| S1 | −2.6724E−03 | 5.7820E−03 | −2.0172E−02 | 3.1691E−02 | −2.6364E−02 |
| S2 | −4.7345E−04 | −9.1164E−03 | 8.4265E−03 | 1.4078E−02 | −3.0409E−02 |
| S3 | −3.0067E−03 | 1.6130E−02 | −4.7779E−02 | 8.5553E−02 | −8.7492E−02 |
| S4 | −9.3665E−03 | 2.7217E−03 | 9.7619E−03 | −2.3587E−02 | 2.1125E−02 |
| S5 | −3.8739E−02 | 1.5384E−02 | −4.2400E−02 | −2.7994E−03 | 1.3083E−03 |
| S6 | −2.1113E−02 | 1.8497E−03 | 2.6304E−02 | −4.4950E−02 | 3.8841E−02 |
| S7 | −1.4491E−02 | 2.7449E−02 | −7.5007E−02 | 1.0086E−01 | −8.6600E−02 |
| S8 | −4.3348E−02 | 3.0892E−02 | −3.2848E−03 | −4.3917E−02 | 6.1626E−02 |
| S9 | −7.7352E−02 | 5.8556E−02 | −6.3634E−02 | 6.2351E−02 | −4.6973E−02 |
| S10 | −7.2430E−02 | 3.6235E−02 | −3.1026E−02 | 2.4265E−02 | −1.3650E−02 |
| S11 | −3.5975E−03 | −2.7628E−02 | 2.8903E−02 | −2.5999E−02 | 1.4441E−02 |
| S12 | −7.0034E−02 | 5.4427E−02 | −4.2454E−02 | 2.1619E−02 | −7.3701E−03 |
| S13 | −5.7639E−02 | −4.7105E−03 | 8.5821E−03 | −2.1736E−03 | 2.7371E−04 |
| S14 | −4.6234E−02 | 1.1379E−02 | −1.7166E−03 | 1.5571E−04 | −9.4744E−06 |

| Surface number | A14 | A16 | A18 | A20 |
|---|---|---|---|---|
| S1 | 1.2025E−02 | −3.0201E−03 | 3.8954E−04 | −2.0036E−05 |
| S2 | 2.0146E−02 | −6.0877E−03 | 8.4777E−04 | −4.2682E−05 |
| S3 | 4.9468E−02 | −1.5417E−02 | 2.5025E−03 | −1.6647E−04 |
| S4 | −9.8952E−03 | 2.5588E−03 | −3.3786E−04 | 1.6875E−05 |
| S5 | 2.8984E−03 | −2.7583E−03 | 8.9783E−04 | −1.0373E−04 |
| S6 | −1.7069E−02 | 2.9421E−03 | 2.2317E−04 | −1.0338E−04 |
| S7 | 4.6573E−02 | −1.5035E−02 | 2.5879E−03 | −1.7410E−04 |
| S8 | −4.4138E−02 | 1.8169E−02 | −4.0869E−03 | 3.9189E−04 |
| S9 | 2.3379E−02 | −7.2311E−03 | 1.2490E−03 | −9.0783E−05 |
| S10 | 4.9530E−03 | −1.0950E−03 | 1.3568E−04 | −7.2596E−06 |
| S11 | −4.9053E−03 | 9.8493E−04 | −1.0561E−04 | 4.6225E−06 |
| S12 | 1.6606E−03 | −2.3052E−04 | 1.7580E−05 | −5.6023E−07 |
| S13 | −1.9461E−05 | 7.5479E−07 | −1.2828E−08 | 1.8807E−11 |
| S14 | 4.7253E−07 | −2.2408E−08 | 8.2883E−10 | −1.4782E−11 |

Figure 4A:
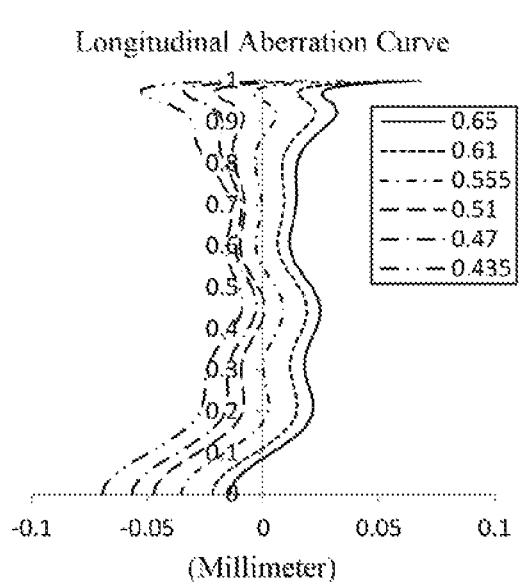
FIGS. 4A to 4D illustrate a longitudinal aberration curve, an astigmatic curve, a distortion curve, and a lateral color curve of the optical imaging system of the Example 2, respectively.
Figure 4B:
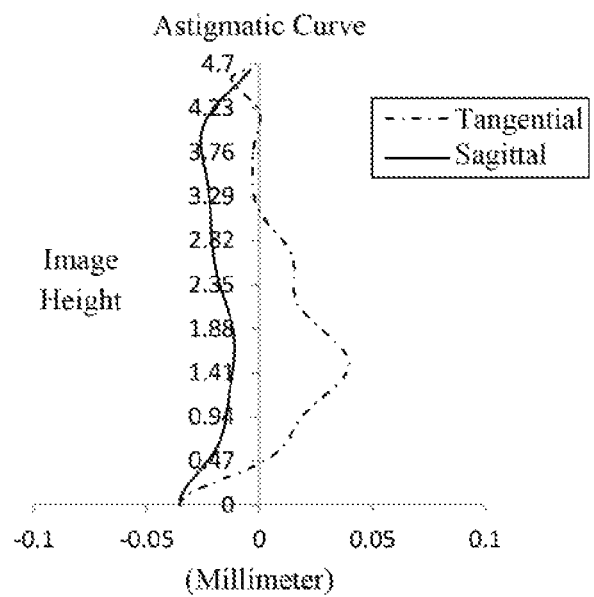
Figure 4C:
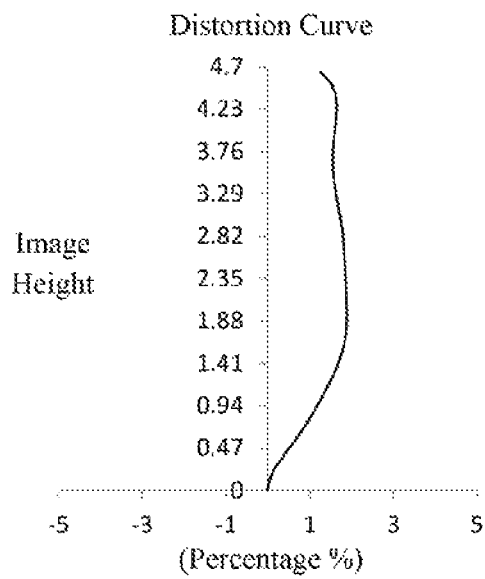
Figure 4D:
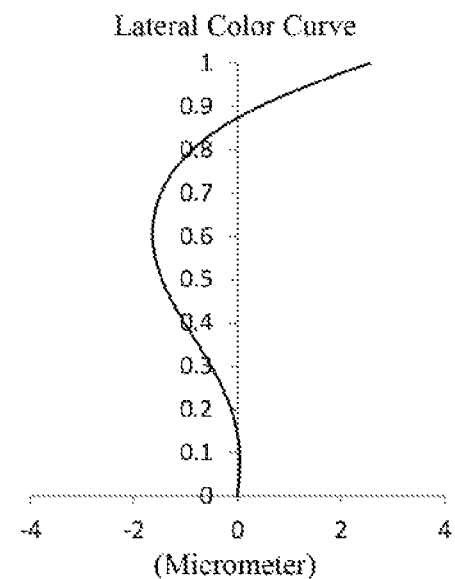

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve good image quality.

Example 3

Figure 5:
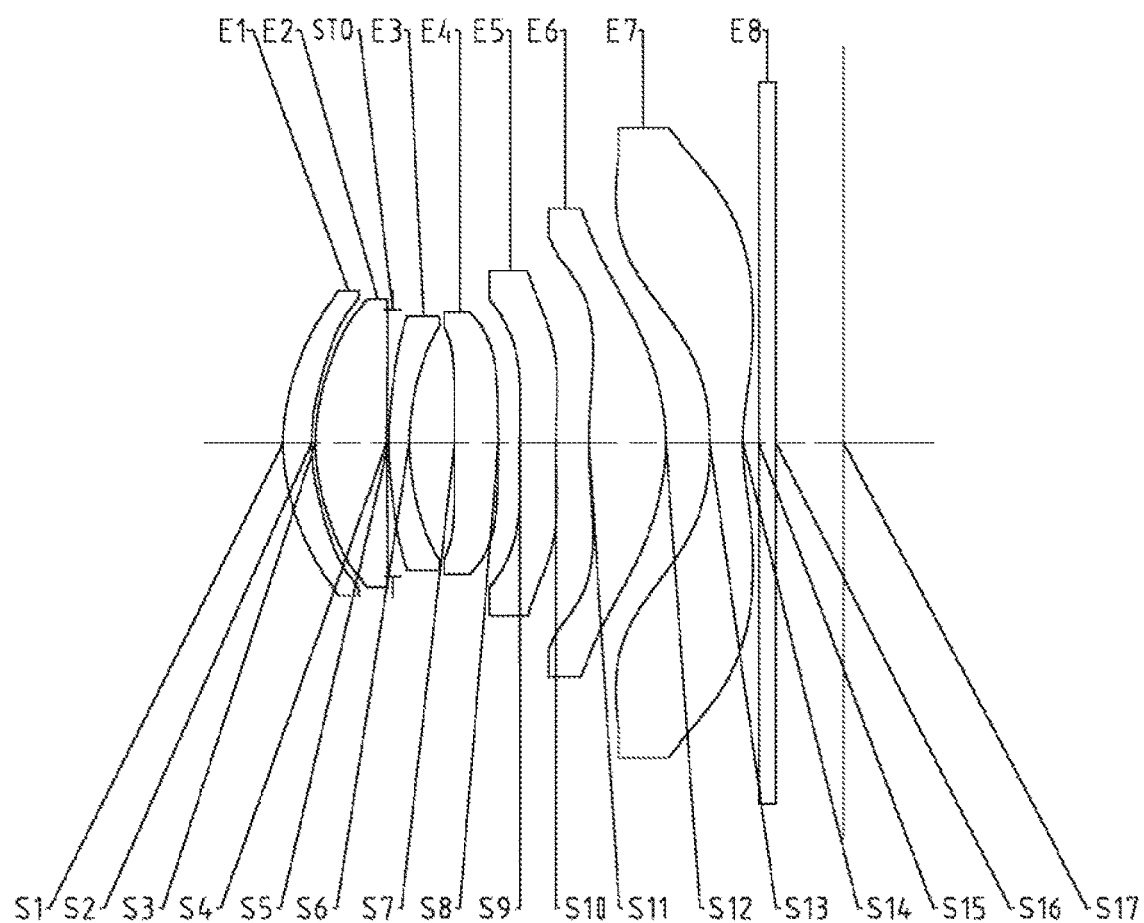
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure. As shown in FIG. 5, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 3, an effective focal length f of the optical imaging system is 5.42 mm, and an on-axis distance TTL from the object-side surface S1 of the first lens E1 to the imaging plane S17 is 6.81 mm.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.5605 | 0.3462 | 1.546 | 56.11 | 94.38 | −0.1565 |
| S2 | Aspheric | 2.5657 | 0.0463 | | | | −0.7062 |
| S3 | Aspheric | 2.5302 | 0.8671 | 1.546 | 56.11 | 5.11 | −0.4006 |
| S4 | Aspheric | 24.0600 | 0.0729 | | | | −23.8329 |
| STO | Spherical | Infinite | −0.0500 | | | | |
| S5 | Aspheric | 4.0022 | 0.2500 | 1.678 | 19.25 | −12.40 | 3.8518 |
| S6 | Aspheric | 2.6421 | 0.5509 | | | | 0.5788 |
| S7 | Aspheric | 76.2566 | 0.5303 | 1.546 | 56.11 | 68.75 | 99.0000 |
| S8 | Aspheric | −73.7338 | 0.2614 | | | | −99.0000 |
| S9 | Aspheric | 10.1921 | 0.4384 | 1.666 | 20.40 | −26.58 | 15.9741 |
| S10 | Aspheric | 6.3583 | 0.4026 | | | | −38.8197 |
| S11 | Aspheric | 6.0998 | 0.9353 | 1.546 | 56.11 | 3.41 | −24.1327 |
| S12 | Aspheric | −2.5313 | 0.5333 | | | | −17.3874 |
| S13 | Aspheric | −3.7497 | 0.4000 | 1.536 | 55.74 | −2.94 | −1.0205 |
| S14 | Aspheric | 2.8231 | 0.1911 | | | | −15.7060 |
| S15 | Spherical | Infinite | 0.2100 | 1.517 | 64.20 | | |
| S16 | Spherical | Infinite | 0.8241 | | | | |
| S17 | Spherical | Infinite | | | | | |

TABLE 6

| Surface number | A4 | A6 | A8 | A10 | A12 |
|---|---|---|---|---|---|
| S1 | −5.1000E−03 | −5.3325E−03 | 1.7490E−05 | 6.8385E−03 | −7.5997E−03 |
| S2 | −2.6849E−03 | −5.5754E−02 | 6.4365E−02 | −4.0152E−02 | 1.5630E−02 |
| S3 | 2.8186E−03 | −3.4776E−02 | 2.4059E−02 | 5.4144E−03 | −1.8704E−02 |
| S4 | −3.7161E−02 | 9.0409E−02 | −1.3848E−01 | 1.3319E−01 | −8.4798E−02 |
| S5 | −8.5109E−02 | 1.0161E−01 | −1.2811E−01 | 1.1823E−01 | −7.4015E−02 |
| S6 | −4.9194E−02 | 1.4320E−02 | 3.2075E−02 | −7.3267E−02 | 8.1030E−02 |
| S7 | −2.5094E−02 | 2.3978E−02 | −5.9432E−02 | 6.9633E−02 | −5.0041E−02 |
| S8 | −5.5119E−02 | 2.6286E−02 | 9.2461E−03 | −6.8999E−02 | 8.7163E−02 |
| S9 | −1.2617E−01 | 1.0238E−01 | −1.0554E−01 | 9.2880E−02 | −6.2475E−02 |
| S10 | −1.0796E−01 | 7.9153E−02 | −7.4249E−02 | 5.9516E−02 | −3.3959E−02 |
| S11 | −2.5315E−02 | 7.4687E−03 | −1.2912E−02 | 1.0437E−02 | −4.6246E−03 |
| S12 | −7.3147E−02 | 6.3236E−02 | −4.6339E−02 | 2.1878E−02 | −6.3888E−03 |
| S13 | −7.0990E−02 | 2.2240E−02 | −4.9091E−03 | 1.2885E−03 | −2.5404E−04 |
| S14 | −4.2995E−02 | 1.3783E−02 | −3.0991E−03 | 4.6247E−04 | −4.5989E−05 |

| Surface number | A14 | A16 | A18 | A20 |
|---|---|---|---|---|
| S1 | 3.9168E−03 | −1.0470E−03 | 1.3833E−04 | −7.1012E−06 |
| S2 | −3.7504E−03 | 6.8515E−04 | −1.1966E−04 | 1.1507E−05 |
| S3 | 1.3236E−02 | −4.6239E−03 | 8.2039E−04 | −5.9230E−05 |
| S4 | 3.5701E−02 | −9.5254E−03 | 1.4550E−03 | −9.6720E−05 |
| S5 | 3.0901E−02 | −8.2310E−03 | 1.2572E−03 | −8.3977E−05 |
| S6 | −5.2173E−02 | 1.9714E−02 | −4.0150E−03 | 3.3515E−04 |
| S7 | 1.9166E−02 | −2.2820E−03 | −7.1124E−04 | 1.8616E−04 |
| S8 | −5.9192E−02 | 2.3506E−02 | −5.1080E−03 | 4.6783E−04 |
| S9 | 2.7286E−02 | −6.8705E−03 | 8.7511E−04 | −4.1549E−05 |
| S10 | 1.2501E−02 | −2.7560E−03 | 3.2873E−04 | −1.6282E−05 |
| S11 | 1.1946E−03 | −1.8245E−04 | 1.5508E−05 | −5.6888E−07 |
| S12 | 1.1561E−03 | −1.2622E−04 | 7.6132E−06 | −1.9476E−07 |
| S13 | 3.0398E−05 | −2.1194E−06 | 7.9987E−08 | −1.2693E−09 |
| S14 | 2.9619E−06 | −1.1855E−07 | 2.7687E−09 | −3.0758E−11 |

Figures 6A, 6B:
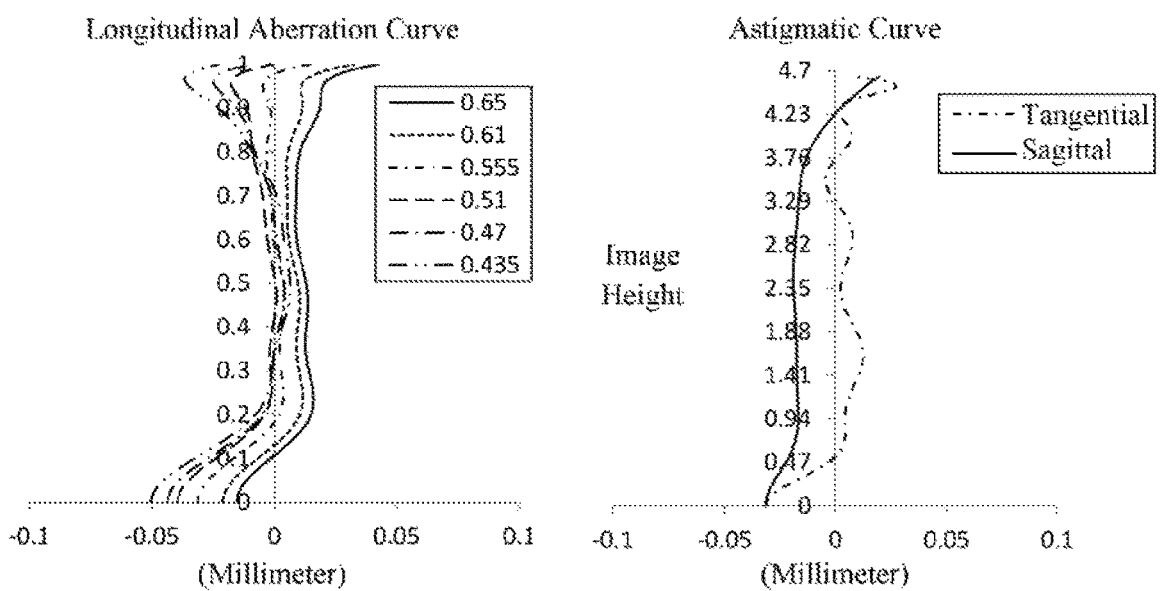
FIGS. 6A to 6D illustrate a longitudinal aberration curve, an astigmatic curve, a distortion curve, and a lateral color curve of the optical imaging system of the Example 3, respectively.
Figure 6C:
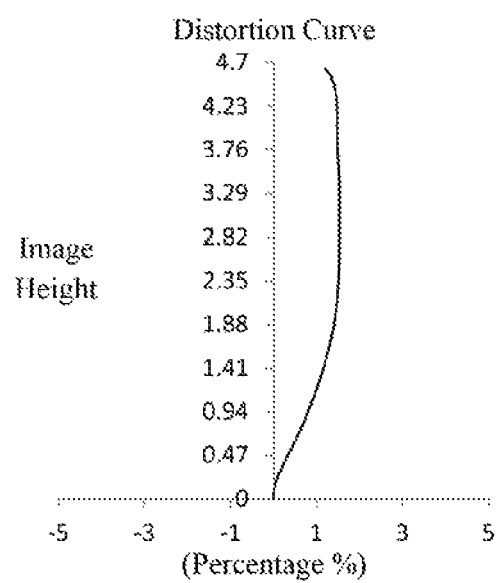
Figure 6D:
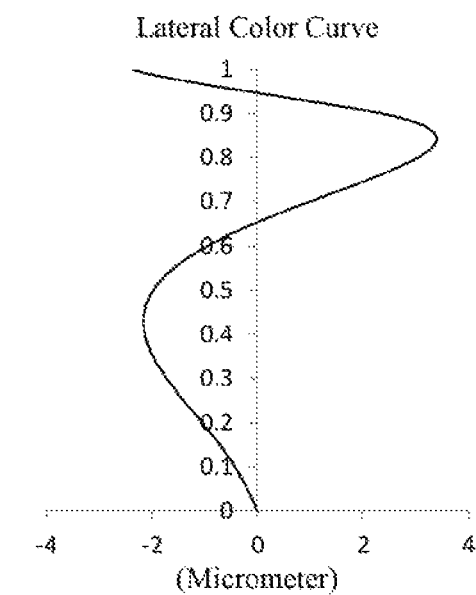

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve good image quality.

Example 4

Figure 7:
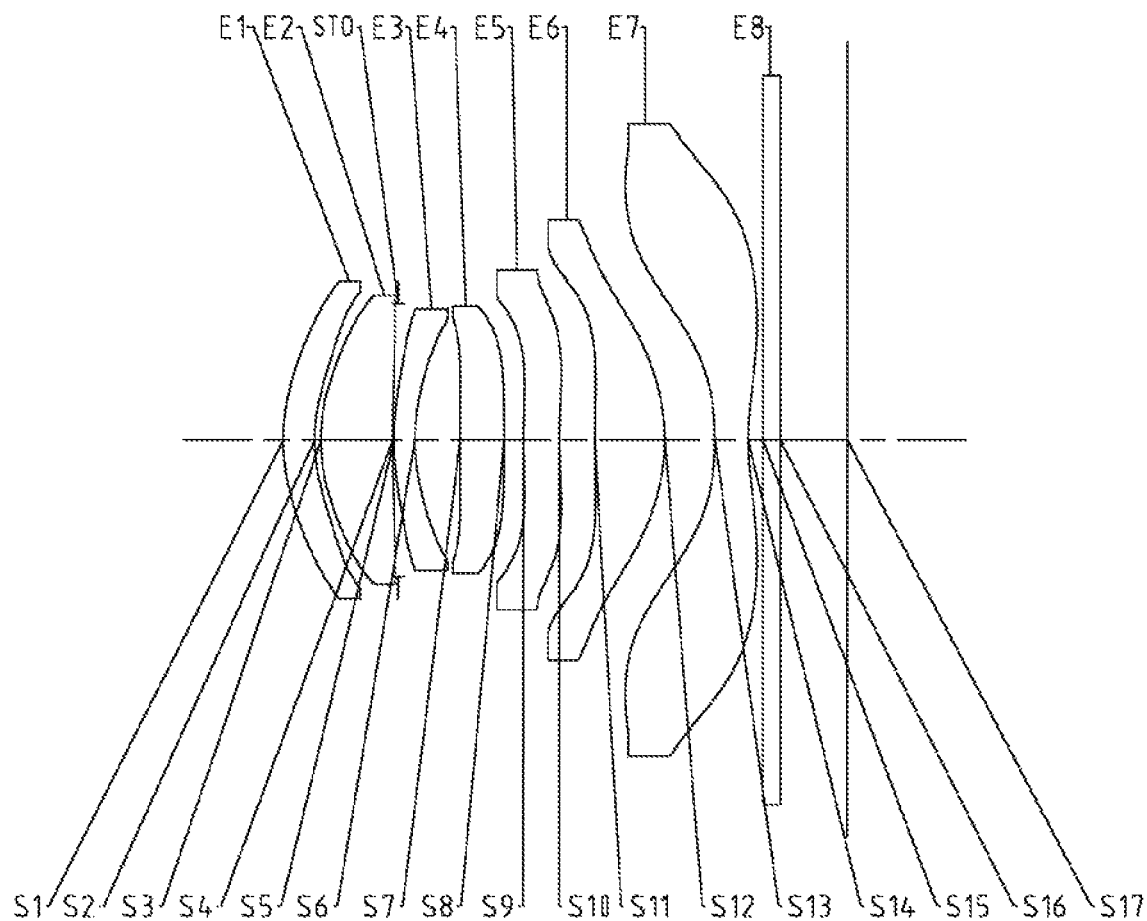
FIG. 7 illustrates a schematic structural view of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure. As shown in FIG. 7, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 4, an effective focal length f of the optical imaging system is 5.42 mm, and an on-axis distance TTL from the object-side surface S1 of the first lens E1 to the imaging plane S17 is 6.82 mm.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.5547 | 0.3789 | 1.546 | 56.11 | −57.61 | −0.3465 |
| S2 | Aspheric | 2.2391 | 0.0734 | | | | −1.5904 |
| S3 | Aspheric | 2.2829 | 0.8692 | 1.546 | 56.11 | 4.53 | −0.6941 |
| S4 | Aspheric | 25.6037 | 0.0678 | | | | 40.2054 |
| STO | Spherical | Infinite | −0.0500 | | | | |
| S5 | Aspheric | 3.4442 | 0.2500 | 1.678 | 19.25 | −12.95 | 3.1006 |
| S6 | Aspheric | 2.4006 | 0.5478 | | | | 0.1663 |
| S7 | Aspheric | 39.3003 | 0.5303 | 1.546 | 56.11 | 76.82 | 85.7638 |
| S8 | Aspheric | 622.0682 | 0.2332 | | | | 99.0000 |
| S9 | Aspheric | 7.2457 | 0.4384 | 1.666 | 20.40 | −69.99 | 8.7501 |
| S10 | Aspheric | 6.1318 | 0.4254 | | | | −16.9718 |
| S11 | Aspheric | 14.2844 | 0.8484 | 1.546 | 56.11 | 3.73 | −43.3927 |
| S12 | Aspheric | −2.3215 | 0.6037 | | | | −16.2213 |
| S13 | Aspheric | −3.7096 | 0.4000 | 1.536 | 55.74 | −3.08 | −1.5740 |
| S14 | Aspheric | 3.0955 | 0.1812 | | | | −18.0955 |
| S15 | Spherical | Infinite | 0.2100 | 1.517 | 64.20 | | |
| S16 | Spherical | Infinite | 0.8122 | | | | |
| S17 | Spherical | Infinite | | | | | |

TABLE 8

| Surface number | A4 | A6 | A8 | A10 | A12 |
|---|---|---|---|---|---|
| S1 | −6.9885E−03 | −7.3474E−03 | 1.8183E−03 | 3.7826E−03 | −4.3727E−03 |
| S2 | 9.5048E−03 | −5.7954E−02 | 3.9345E−02 | −1.5561E−02 | 4.7044E−03 |
| S3 | 1.5257E−02 | −3.7305E−02 | 1.1117E−02 | 7.3161E−03 | −8.5644E−03 |
| S4 | 1.0146E−02 | −1.2147E−02 | 5.4625E−04 | 5.1527E−03 | −4.9840E−03 |
| S5 | −5.8488E−02 | 2.2898E−02 | −5.0586E−02 | 8.5957E−02 | −8.5550E−02 |
| S6 | −5.5668E−02 | 2.3599E−02 | −1.5981E−02 | 1.9319E−02 | −1.5698E−02 |
| S7 | −1.8103E−02 | 2.6254E−02 | −6.8797E−02 | 9.7946E−02 | −9.3799E−02 |
| S8 | −5.3319E−02 | 3.1257E−02 | −7.6350E−03 | −3.3500E−02 | 4.6270E−02 |
| S9 | −1.1051E−01 | 7.4636E−02 | −7.0083E−02 | 5.3470E−02 | −3.1061E−02 |
| S10 | −8.5343E−02 | 4.9714E−02 | −3.9627E−02 | 2.7876E−02 | −1.4595E−02 |
| S11 | −2.9951E−02 | 3.5325E−03 | −7.5435E−03 | 4.9451E−03 | −1.2016E−03 |
| S12 | −1.0385E−01 | 8.6061E−02 | −5.9482E−02 | 2.7308E−02 | −7.9516E−03 |
| S13 | −7.0193E−02 | 2.5404E−02 | −5.2982E−03 | 9.7310E−04 | −1.4415E−04 |
| S14 | −4.0876E−02 | 1.3050E−02 | −2.9392E−03 | 4.3919E−04 | −4.4529E−05 |

| Surface number | A14 | A16 | A18 | A20 |
|---|---|---|---|---|
| S1 | 2.1127E−03 | −5.2250E−04 | 6.5071E−05 | −3.2804E−06 |
| S2 | −1.0513E−03 | 1.9538E−04 | −2.9624E−05 | 2.0742E−06 |
| S3 | 4.3647E−03 | −1.2508E−03 | 1.8846E−04 | −1.1555E−05 |
| S4 | 2.7842E−03 | −9.4544E−04 | 1.7440E−04 | −1.3155E−05 |
| S5 | 5.2097E−02 | −1.9245E−02 | 3.9524E−03 | −3.4753E−04 |
| S6 | 7.2926E−03 | −1.7336E−03 | 1.3987E−04 | 8.3842E−06 |
| S7 | 5.8579E−02 | −2.2851E−02 | 5.0328E−03 | −4.7588E−04 |
| S8 | −3.1107E−02 | 1.1964E−02 | −2.4982E−03 | 2.1986E−04 |
| S9 | 1.1221E−02 | −2.1250E−03 | 1.6191E−04 | −7.0817E−07 |
| S10 | 4.9055E−03 | −9.6736E−04 | 1.0233E−04 | −4.5292E−06 |
| S11 | −7.9944E−05 | 8.9928E−05 | −1.4691E−05 | 7.6609E−07 |
| S12 | 1.4757E−03 | −1.6967E−04 | 1.1001E−05 | −3.0681E−07 |
| S13 | 1.4593E−05 | −9.1699E−07 | 3.2203E−08 | −4.8434E−10 |
| S14 | 3.0086E−06 | −1.3036E−07 | 3.3797E−09 | −4.1567E−11 |

Figure 8A:
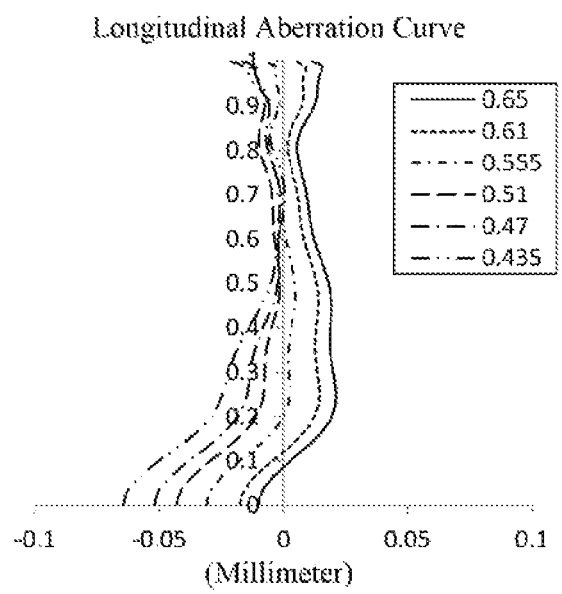
FIGS. 8A to 8D illustrate a longitudinal aberration curve, an astigmatic curve, a distortion curve, and a lateral color curve of the optical imaging system of the Example 4, respectively.
Figure 8B:
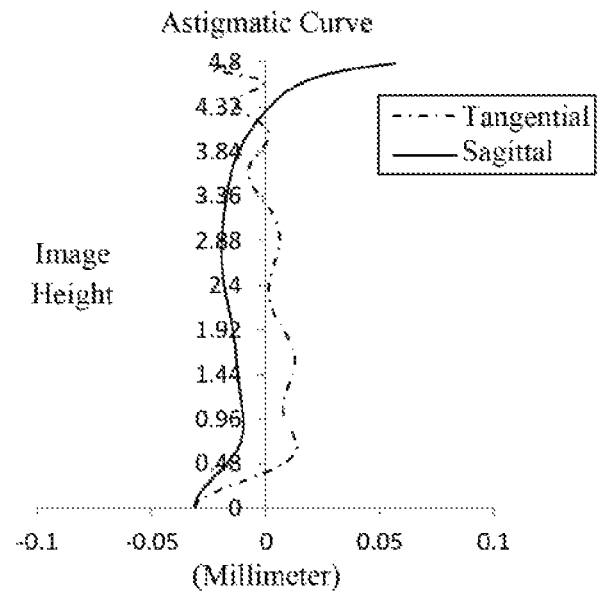
Figure 8C:
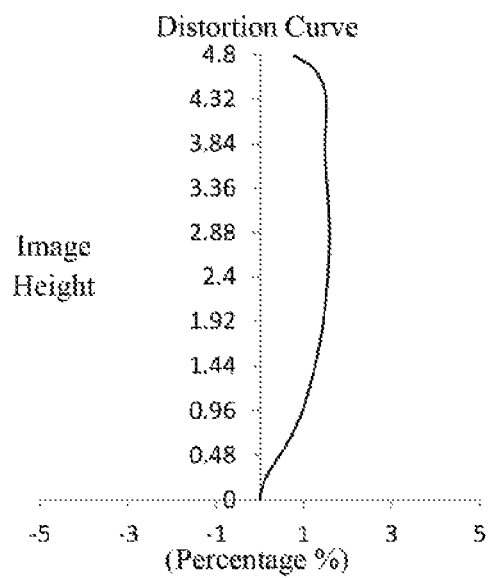
Figure 8D:
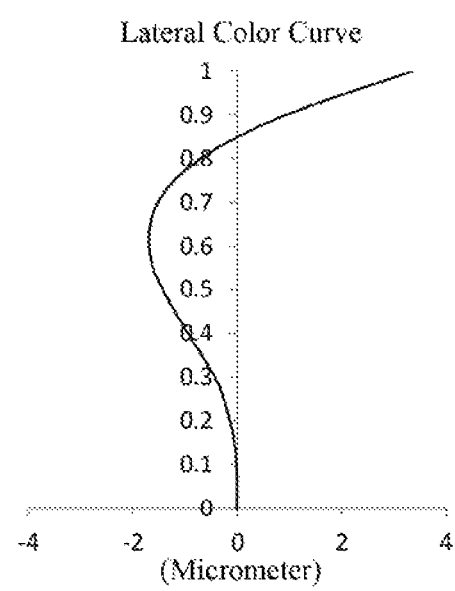

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve good image quality.

Example 5

Figure 9:
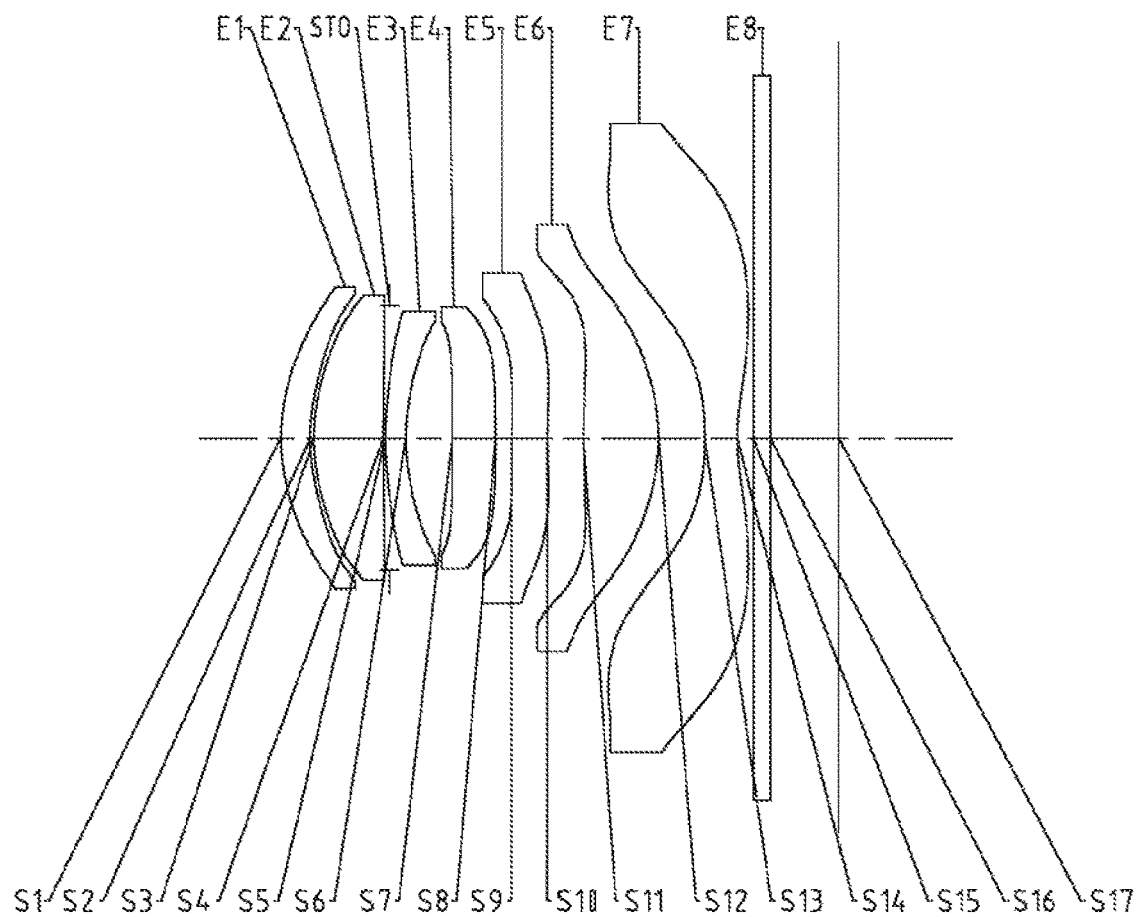
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure. As shown in FIG. 9, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 5, an effective focal length f of the optical imaging system is 5.41 mm, and an on-axis distance TTL from the object-side surface S1 of the first lens E1 to the imaging plane S17 is 6.81 mm.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 2.5585 | 0.3538 | 1.546 | 56.11 | 59.87 | −0.1705 |
| S2 | Aspheric | 2.6402 | 0.0449 | | | | −0.6724 |
| S3 | Aspheric | 2.6307 | 0.8525 | 1.546 | 56.11 | 5.33 | −0.3056 |
| S4 | Aspheric | 24.4127 | 0.0734 | | | | −16.0002 |
| STO | Spherical | Infinite | −0.0500 | | | | |
| S5 | Aspheric | 4.0812 | 0.2500 | 1.678 | 19.25 | −12.93 | 3.8638 |
| S6 | Aspheric | 2.7156 | 0.5680 | | | | 0.5399 |
| S7 | Aspheric | 80.1481 | 0.5303 | 1.546 | 56.11 | 90.52 | −18.9418 |
| S8 | Aspheric | −128.5756 | 0.1972 | | | | 99.0000 |
| S9 | Aspheric | 10.7983 | 0.4384 | 1.666 | 20.40 | −37.20 | 9.3596 |
| S10 | Aspheric | 7.4000 | 0.4325 | | | | −43.1642 |
| S11 | Aspheric | 8.5649 | 0.9205 | 1.546 | 56.11 | 3.46 | −48.2400 |
| S12 | Aspheric | −2.3330 | 0.5628 | | | | −14.0185 |
| S13 | Aspheric | −3.9261 | 0.4000 | 1.536 | 55.74 | −2.93 | −0.8381 |
| S14 | Aspheric | 2.7105 | 0.1962 | | | | −14.6327 |
| S15 | Spherical | Infinite | 0.2100 | 1.517 | 64.20 | | |
| S16 | Spherical | Infinite | 0.8294 | | | | |
| S17 | Spherical | Infinite | | | | | |

TABLE 10

| Surface number | A4 | A6 | A8 | A10 | A12 |
|---|---|---|---|---|---|
| S1 | −5.1926E−03 | −4.9627E−03 | −5.7686E−04 | 7.3026E−03 | −7.8263E−03 |
| S2 | −2.2020E−03 | −5.7171E−02 | 6.6443E−02 | −4.1779E−02 | 1.6393E−02 |
| S3 | 3.6240E−03 | −3.6838E−02 | 2.6143E−02 | 6.0069E−03 | −2.1187E−02 |
| S4 | −3.2158E−02 | 7.7292E−02 | −1.2268E−01 | 1.2448E−01 | −8.4646E−02 |
| S5 | −7.9124E−02 | 8.8726E−02 | −1.1995E−01 | 1.2556E−01 | −9.2016E−02 |
| S6 | −4.6667E−02 | 1.2778E−02 | 2.4186E−02 | −5.3755E−02 | 5.8690E−02 |
| S7 | −1.9765E−02 | 1.8572E−02 | −5.2996E−02 | 6.6033E−02 | −5.2870E−02 |
| S8 | −5.9303E−02 | 3.1520E−02 | 5.8476E−03 | −6.7698E−02 | 8.6173E−02 |
| S9 | −1.2904E−01 | 1.1061E−01 | −1.2785E−01 | 1.2902E−01 | −9.7257E−02 |
| S10 | −9.8515E−02 | 6.6547E−02 | −6.2154E−02 | 5.1120E−02 | −3.0089E−02 |
| S11 | −1.9480E−02 | 1.1425E−03 | −1.0382E−02 | 1.0085E−02 | −5.6232E−03 |
| S12 | −7.6368E−02 | 6.5683E−02 | −5.1100E−02 | 2.6061E−02 | −8.7827E−03 |
| S13 | −6.6759E−02 | 1.9349E−02 | −4.7503E−03 | 1.4598E−03 | −3.0245E−04 |
| S14 | −4.0130E−02 | 1.1325E−02 | −2.2649E−03 | 3.0233E−04 | −2.6930E−05 |

| Surface number | A14 | A16 | A18 | A20 |
|---|---|---|---|---|
| S1 | 3.9602E−03 | −1.0377E−03 | 1.3314E−04 | −6.5149E−06 |
| S2 | −3.9648E−03 | 7.3010E−04 | −1.2852E−04 | 1.2459E−05 |
| S3 | 1.5307E−02 | −5.4598E−03 | 9.8904E−04 | −7.2905E−05 |
| S4 | 3.8279E−02 | −1.0983E−02 | 1.8028E−03 | −1.2864E−04 |
| S5 | 4.5900E−02 | −1.4777E−02 | 2.7511E−03 | −2.2464E−04 |
| S6 | −3.7560E−02 | 1.4194E−02 | −2.9178E−03 | 2.5016E−04 |
| S7 | 2.5506E−02 | −6.7916E−03 | 7.6916E−04 | −1.8947E−06 |
| S8 | −5.8657E−02 | 2.3384E−02 | −5.0970E−03 | 4.6713E−04 |
| S9 | 4.7420E−02 | −1.3730E−02 | 2.1398E−03 | −1.3881E−04 |
| S10 | 1.1525E−02 | −2.6744E−03 | 3.3935E−04 | −1.8016E−05 |
| S11 | 1.9102E−03 | −3.8971E−04 | 4.3973E−05 | −2.0932E−06 |
| S12 | 1.9240E−03 | −2.5820E−04 | 1.9072E−05 | −5.9127E−07 |
| S13 | 3.6554E−05 | −2.5494E−06 | 9.6054E−08 | −1.5218E−09 |
| S14 | 1.5287E−06 | −5.2234E−08 | 1.0372E−09 | −1.1059E−11 |

Figure 10A:
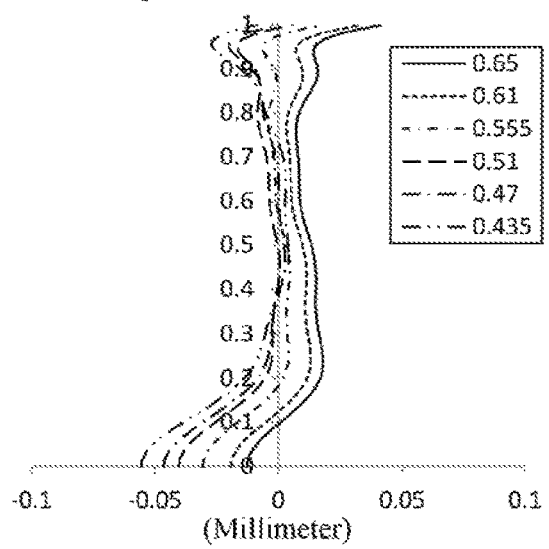
FIGS. 10A to 10D illustrate a longitudinal aberration curve, an astigmatic curve, a distortion curve, and a lateral color curve of the optical imaging system of the Example 5, respectively.
Figure 10B:
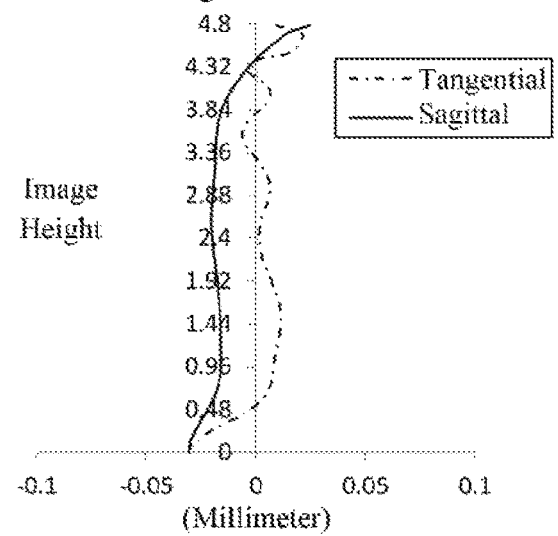
Figure 10C:
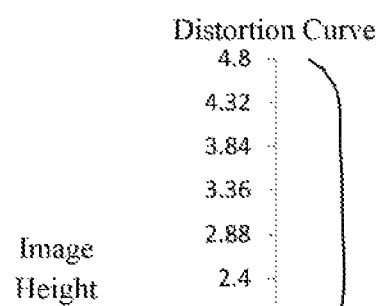
Figure 10D:
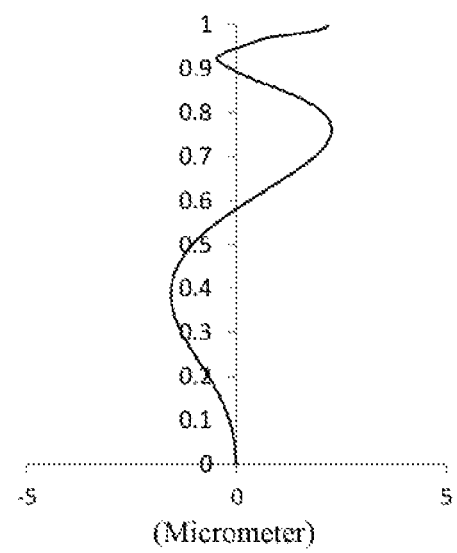

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve good image quality.

Example 6

Figure 11:
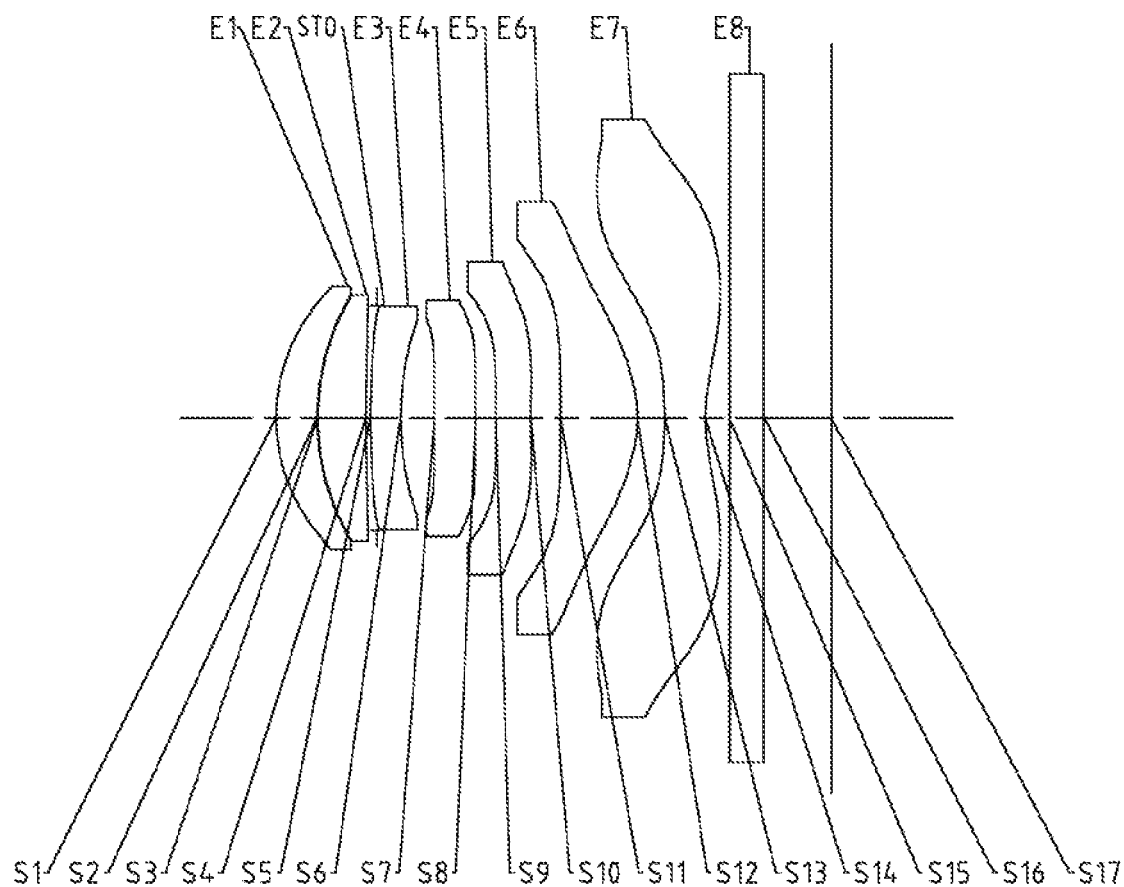
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure. As shown in FIG. 11, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 5, an effective focal length f of the optical imaging system is 5.71 mm, and an on-axis distance TTL from the object-side surface S1 of the first lens E1 to the imaging plane S17 is 6.90 mm.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.2411 | 0.5064 | 1.546 | 56.11 | 13.13 | 0.0053 |
| S2 | Spherical | 3.0000 | 0.0100 | | | | 0.0000 |
| S3 | Spherical | 3.0000 | 0.6000 | 1.546 | 56.11 | 7.09 | 0.0000 |
| S4 | Aspheric | 12.4218 | 0.1406 | | | | −2.7952 |
| STO | Spherical | Infinite | −0.0883 | | | | |
| S5 | Aspheric | 6.6822 | 0.3786 | 1.666 | 20.40 | −12.37 | −2.2967 |
| S6 | Aspheric | 3.6048 | 0.4200 | | | | −0.5273 |
| S7 | Aspheric | 38.0000 | 0.5112 | 1.546 | 56.11 | −864.05 | 1.7261 |
| S8 | Aspheric | 35.0000 | 0.2535 | | | | 2.0653 |
| S9 | Aspheric | 23.0116 | 0.4335 | 1.666 | 20.40 | −46.60 | 98.3956 |
| S10 | Aspheric | 13.1127 | 0.3705 | | | | −28.1672 |
| S11 | Aspheric | 597.5308 | 0.9549 | 1.546 | 56.11 | 3.20 | −99.0000 |
| S12 | Aspheric | −1.7513 | 0.3400 | | | | −8.8272 |
| S13 | Aspheric | −5.8514 | 0.5000 | 1.536 | 55.74 | −2.77 | −1.8235 |
| S14 | Aspheric | 2.0517 | 0.3026 | | | | −9.6856 |
| S15 | Spherical | Infinite | 0.4276 | 1.517 | 64.20 | | |
| S16 | Spherical | Infinite | 0.8378 | | | | |
| S17 | Spherical | Infinite | | | | | |

TABLE 12

| Surface number | A4 | A6 | A8 | A10 | A12 |
|---|---|---|---|---|---|
| S1 | 1.1986E−04 | −3.2491E−03 | 1.0622E−02 | −1.7875E−02 | 1.7391E−02 |
| S4 | −7.6997E−02 | 1.1074E−01 | −8.3075E−02 | 1.2016E−02 | 3.9482E−02 |
| S5 | −8.9644E−02 | 1.2405E−01 | −8.8501E−02 | 7.4499E−03 | 5.6845E−02 |
| S6 | −2.6689E−02 | 1.8993E−02 | 4.6861E−02 | −1.4176E−01 | 2.0015E−01 |
| S7 | −3.7405E−02 | 1.0099E−02 | 1.6160E−03 | −1.0979E−01 | 2.7881E−01 |
| S8 | −4.7487E−02 | 4.3494E−03 | 2.3907E−02 | −7.2394E−02 | 8.6360E−02 |
| S9 | −8.3706E−02 | 5.4778E−03 | 3.2938E−02 | −5.6108E−02 | 4.8074E−02 |
| S10 | −7.3530E−02 | 9.7250E−03 | −3.1779E−04 | 8.4417E−03 | −1.2687E−02 |
| S11 | −1.7003E−02 | −3.9301E−03 | −1.2490E−02 | 1.8471E−02 | −1.1481E−02 |
| S12 | −8.6550E−02 | 8.1726E−02 | −6.5113E−02 | 3.4410E−02 | −1.1099E−02 |
| S13 | −5.8694E−02 | 8.4751E−03 | 2.0973E−03 | −6.9835E−04 | 7.8199E−05 |
| S14 | −4.8614E−02 | 1.5575E−02 | −3.8021E−03 | 6.3157E−04 | −7.0183E−05 |

| Surface number | A14 | A16 | A18 | A20 |
|---|---|---|---|---|
| S1 | −1.0302E−02 | 3.6434E−03 | −7.0929E−04 | 5.8064E−05 |
| S4 | −4.1609E−02 | 1.9921E−02 | −4.8624E−03 | 4.8919E−04 |
| S5 | −6.2315E−02 | 3.2704E−02 | −8.8965E−03 | 1.0091E−03 |
| S6 | −1.7498E−01 | 9.7989E−02 | −3.2728E−02 | 5.0101E−03 |
| S7 | −3.5955E−01 | 2.5908E−01 | −9.9668E−02 | 1.6028E−02 |
| S8 | −6.2407E−02 | 2.8270E−02 | −7.4033E−03 | 8.6970E−04 |
| S9 | −2.8177E−02 | 1.1398E−02 | −2.6923E−03 | 2.6761E−04 |
| S10 | 7.8228E−03 | −2.3898E−03 | 3.5988E−04 | −2.1409E−05 |
| S11 | 4.0089E−03 | −8.2431E−04 | 9.3399E−05 | −4.4824E−06 |
| S12 | 2.1920E−03 | −2.6038E−04 | 1.7137E−05 | −4.8105E−07 |
| S13 | −3.4898E−06 | −3.3708E−08 | 8.4739E−09 | −2.1666E−10 |
| S14 | 4.9764E−06 | −2.0787E−07 | 4.4596E−09 | −3.5069E−11 |

Figure 12A:
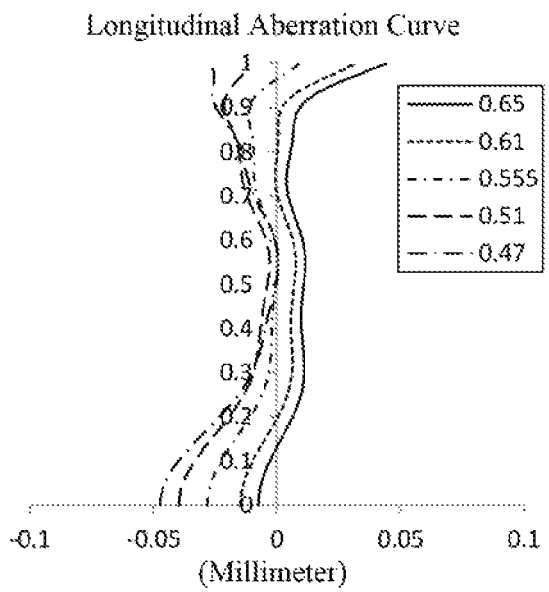
FIGS. 12A to 12D illustrate a longitudinal aberration curve, an astigmatic curve, a distortion curve, and a lateral color curve of the optical imaging system of the Example 6, respectively.
Figure 12B:
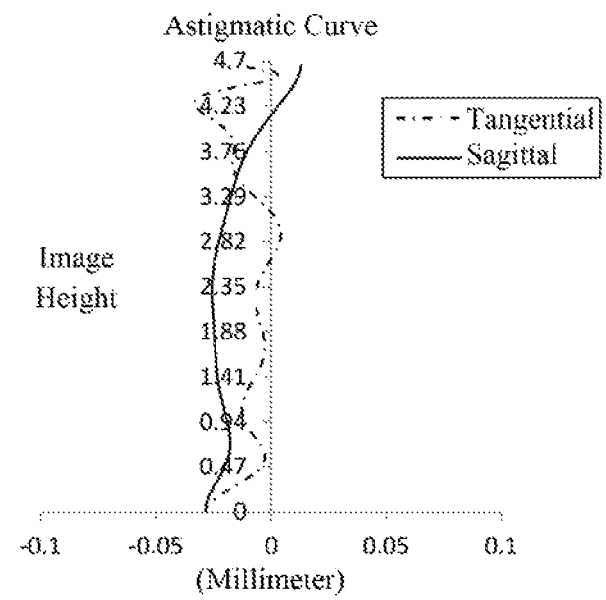
Figure 12C:
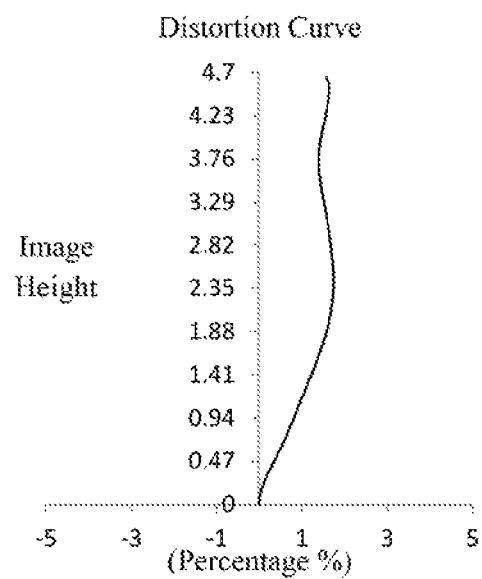
Figure 12D:
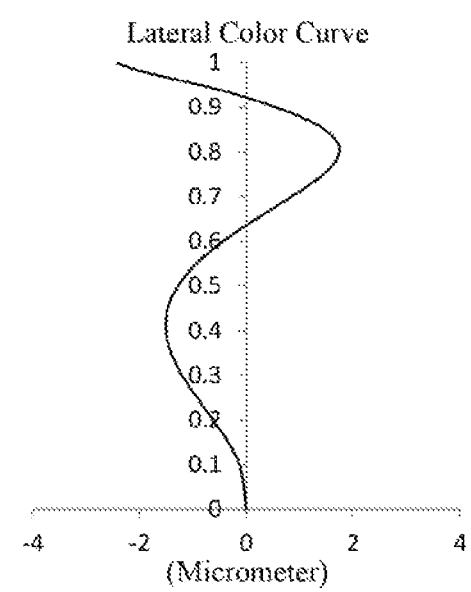

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve good image quality.

Example 7

Figure 13:
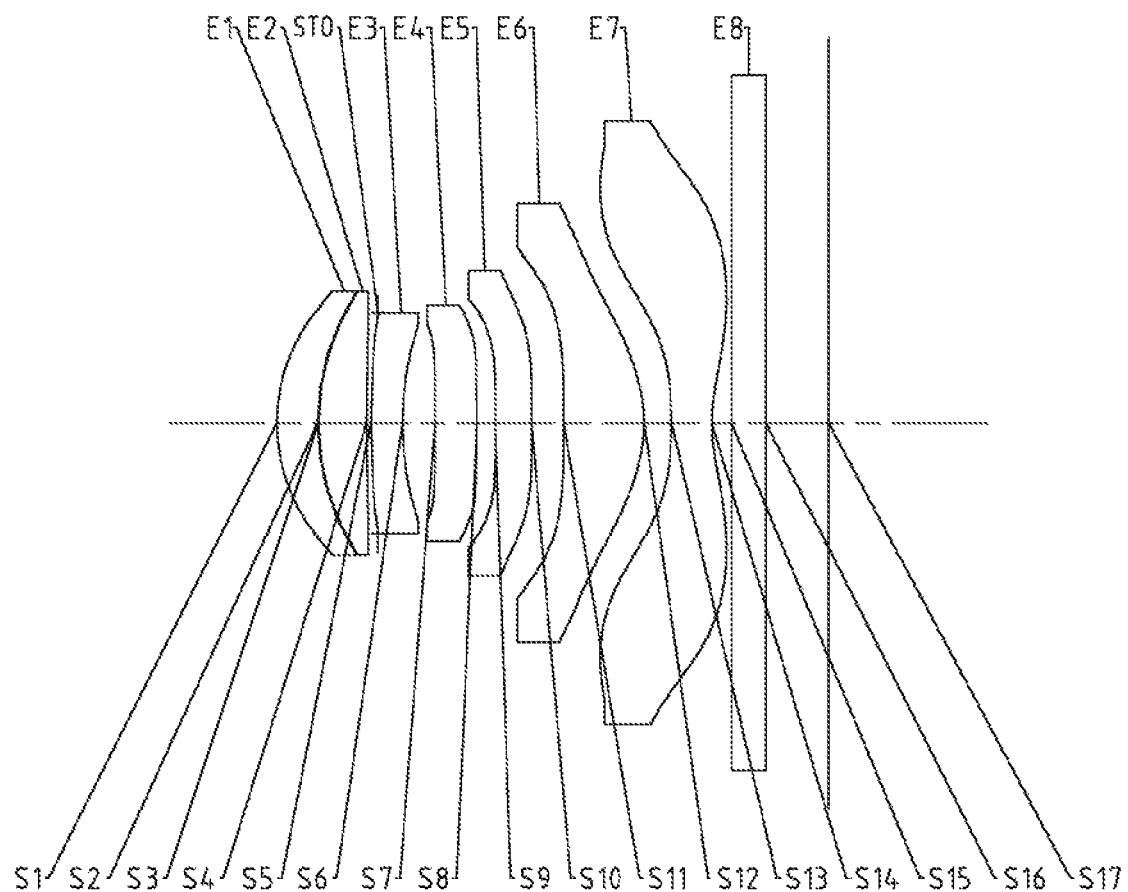
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure. As shown in FIG. 13, the optical imaging system includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 7, an effective focal length f of the optical imaging system is 5.63 mm, and an on-axis distance TTL from the object-side surface S1 of the first lens E1 to the imaging plane S17 is 6.85 mm.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.2411 | 0.5064 | 1.546 | 56.11 | 13.13 | 0.0101 |
| S2 | Spherical | 3.0000 | 0.0100 | | | | 0.0000 |
| S3 | Spherical | 3.0000 | 0.6000 | 1.546 | 56.11 | 7.09 | 0.0000 |
| S4 | Aspheric | 12.4218 | 0.1406 | | | | −20.1644 |
| STO | Spherical | Infinite | −0.0883 | | | | |
| S5 | Aspheric | 7.0273 | 0.3916 | 1.666 | 20.40 | −12.49 | −5.2189 |
| S6 | Aspheric | 3.7239 | 0.4038 | | | | −0.7002 |
| S7 | Aspheric | 39.5456 | 0.5196 | 1.546 | 56.11 | 861.56 | 1.7261 |
| S8 | Aspheric | 42.9753 | 0.2305 | | | | 2.0653 |
| S9 | Aspheric | 24.0000 | 0.4500 | 1.666 | 20.40 | 763.89 | 98.3956 |
| S10 | Aspheric | 25.0000 | 0.4000 | | | | −28.1672 |
| S11 | Aspheric | −42.1560 | 1.0000 | 1.546 | 56.11 | 3.45 | −99.0000 |
| S12 | Aspheric | −1.8187 | 0.3400 | | | | −8.8336 |
| S13 | Aspheric | −5.3853 | 0.5000 | 1.536 | 55.74 | −2.74 | −2.0233 |
| S14 | Aspheric | 2.0925 | 0.2436 | | | | −9.9656 |
| S15 | Spherical | Infinite | 0.4276 | 1.517 | 64.20 | | |
| S16 | Spherical | Infinite | 0.7788 | | | | |
| S17 | Spherical | Infinite | | | | | |

TABLE 14

| Surface number | A4 | A6 | A8 | A10 | A12 |
|---|---|---|---|---|---|
| S1 | 1.2424E−04 | −3.4286E−03 | 1.1412E−02 | −1.9551E−02 | 1.9366E−02 |
| S4 | −7.9400E−02 | 1.1596E−01 | −8.8341E−02 | 1.2976E−02 | 4.3295E−02 |
| S5 | −9.1058E−02 | 1.2699E−01 | −9.1315E−02 | 7.7471E−03 | 5.9578E−02 |
| S6 | −2.6983E−02 | 1.9308E−02 | 4.7900E−02 | −1.4570E−01 | 2.0685E−01 |
| S7 | −3.7405E−02 | 1.0099E−02 | 1.6160E−03 | −1.0979E−01 | 2.7881E−01 |
| S8 | −4.7487E−02 | 4.3494E−03 | 2.3907E−02 | −7.2394E−02 | 8.6360E−02 |
| S9 | −8.3706E−02 | 5.4778E−03 | 3.2938E−02 | −5.6108E−02 | 4.8074E−02 |
| S10 | −7.3530E−02 | 9.7250E−03 | −3.1779E−04 | 8.4417E−03 | −1.2687E−02 |
| S11 | −1.7722E−02 | −4.1819E−03 | −1.3568E−02 | 2.0485E−02 | −1.2999E−02 |
| S12 | −7.9708E−02 | 7.2229E−02 | −5.5225E−02 | 2.8007E−02 | −8.6695E−03 |
| S13 | −5.9233E−02 | 8.5921E−03 | 2.1360E−03 | −7.1450E−04 | 8.0373E−05 |
| S14 | −4.7624E−02 | 1.5101E−02 | −3.6488E−03 | 5.9989E−04 | −6.5980E−05 |

| Surface number | A14 | A16 | A18 | A20 |
|---|---|---|---|---|
| S1 | −1.1679E−02 | 4.2053E−03 | −8.3349E−04 | 6.9466E−05 |
| S4 | −4.6334E−02 | 2.2527E−02 | −5.5836E−03 | 5.7044E−04 |
| S5 | −6.5823E−02 | 3.4817E−02 | −9.5456E−03 | 1.0912E−03 |
| S6 | −1.8182E−01 | 1.0238E−01 | −3.4384E−02 | 5.2925E−03 |
| S7 | −3.5955E−01 | 2.5908E−01 | −9.9668E−02 | 1.6028E−02 |
| S8 | −6.2407E−02 | 2.8270E−02 | −7.4033E−03 | 8.6970E−04 |
| S9 | −2.8177E−02 | 1.1398E−02 | −2.6923E−03 | 2.6761E−04 |
| S10 | 7.8228E−03 | −2.3898E−03 | 3.5988E−04 | −2.1409E−05 |
| S11 | 4.6341E−03 | −9.7279E−04 | 1.1253E−04 | −5.5133E−06 |
| S12 | 1.6430E−03 | −1.8730E−04 | 1.1830E−05 | −3.1868E−07 |
| S13 | −3.6032E−06 | −3.4963E−08 | 8.8298E−09 | −2.2679E−10 |
| S14 | 4.6305E−06 | −1.9144E−07 | 4.0651E−09 | −3.1640E−11 |

Figures 14A, 14B:
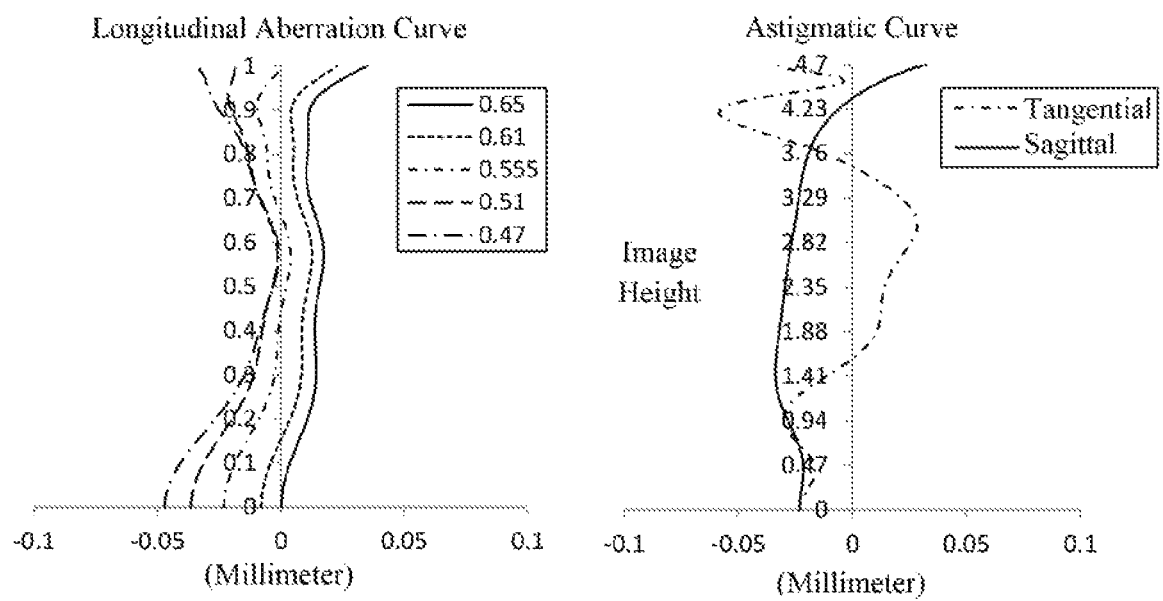
FIGS. 14A to 14D illustrate a longitudinal aberration curve, an astigmatic curve, a distortion curve, and a lateral color curve of the optical imaging system of the Example 7, respectively.
Figure 14C:
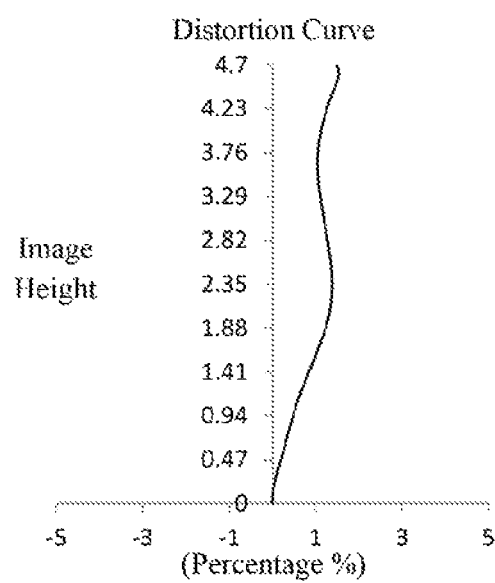
Figure 14D:
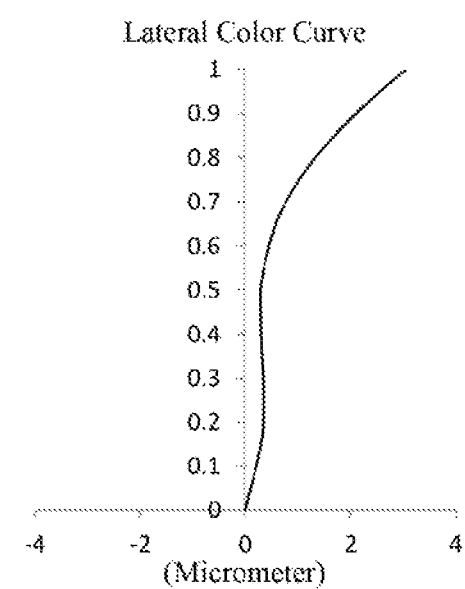

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different image heights. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve good image quality.

In view of the above, examples 1 to 7 respectively satisfy the relationship shown in Table 15.

TABLE 15

| Condition | Example | | | | | | |
|---|---|---|---|---|---|---|---|
| | 1 | 2 | 3 | 4 | 5 | 6 | 7 |
| f*tan(FOV/2) (mm) | 4.54 | 4.53 | 4.54 | 4.71 | 4.71 | 4.54 | 4.60 |
| f/R9 | 0.24 | 0.87 | 0.53 | 0.75 | 0.50 | 0.25 | 0.23 |
| 10*|R2 − R3|/f | 0.00 | 0.33 | 0.07 | 0.08 | 0.02 | 0.00 | 0.00 |
| T12/(CT2 − CT1) | 0.11 | 0.16 | 0.09 | 0.15 | 0.09 | 0.11 | 0.11 |
| |T45 − T56|/|T56 − T67| | 1.84 | 3.35 | 1.08 | 1.08 | 1.81 | 3.83 | 2.82 |
| |T12 − ET12|*10 (mm) | 0.01 | 0.30 | 0.65 | 0.88 | 0.68 | 0.01 | 0.04 |
| |CT4 + CT5 + CT7|/3 (mm) | 0.48 | 0.47 | 0.46 | 0.46 | 0.46 | 0.48 | 0.49 |
| f/f12 | 1.18 | 1.03 | 1.07 | 1.04 | 1.06 | 1.18 | 1.17 |
| f/f3 | −0.48 | −0.39 | −0.44 | −0.42 | −0.42 | −0.46 | −0.45 |
| |f/f4| + |f/f5| | 0.17 | 0.11 | 0.28 | 0.15 | 0.21 | 0.13 | 0.01 |
| f6/CT6 | 3.22 | 3.00 | 3.64 | 4.39 | 3.76 | 3.35 | 3.45 |
| f/R1 | 2.55 | 2.19 | 2.12 | 2.12 | 2.11 | 2.55 | 2.51 |
| R5/R6 | 1.90 | 1.54 | 1.51 | 1.43 | 1.50 | 1.85 | 1.89 |
| f/(EPD*ImgH) (mm$^{-1}$) | 0.39 | 0.32 | 0.33 | 0.31 | 0.32 | 0.39 | 0.38 |
| SL/TTL | 0.88 | 0.81 | 0.80 | 0.80 | 0.81 | 0.82 | 0.82 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device, such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system consisting of seven lenses, sequentially from an object side to an image side of the optical imaging system along an optical axis, comprising:
   a first lens having refractive power with a convex object-side surface;
   a second lens having positive refractive power;
   a third lens having refractive power;
   a fourth lens having refractive power;
   a fifth lens having refractive power;
   a sixth lens having positive refractive power with a convex image-side surface; and
   a seventh lens having negative refractive power,
   wherein f*tan(FOV/2)>4.0 mm, and 0<f/R9<1.0,
   where f is an effective focal length of the optical imaging system, FOV is a maximum field-of-view of the optical imaging system, and R9 is a radius of curvature of an object-side surface of the fifth lens,
   wherein 10*|R2−R3|/f<0.5,
   where R2 is a radius of curvature of an image-side surface of the first lens, R3 is a radius of curvature of an object-side surface of the second lens, and f is the effective focal length of the optical imaging system; and
   wherein 0<T12/(CT2−CT1)≤0.2,
   where T12 is the spaced interval between the first lens and the second lens along the optical axis, CT1 is the center thickness of the first lens along the optical axis, and CT2 is the center thickness of the second lens along the optical axis.

2. The optical imaging system according to claim 1, wherein 1≤|T45−T56|/|T56−T67|<4,
   where T45 is a spaced interval between the fourth lens and the fifth lens along the optical axis, T56 is a spaced interval between the fifth lens and the sixth lens along the optical axis, and T67 is a spaced interval between the sixth lens and the seventh lens along the optical axis.

3. The optical imaging system according to claim 1, wherein |T12−ET12|*10<1.0 mm,
   where ET12 is an edge spaced interval between the first lens and the second lens, and T12 is a spaced interval between the first lens and the second lens along the optical axis.

4. The optical imaging system according to claim 1, wherein 0.4 mm≤(CT4+CT5+CT7)/3<0.6 mm,
   where CT4 is a center thickness of the fourth lens along the optical axis, CT5 is a center thickness of the fifth lens along the optical axis, and CT7 is a center thickness of the seventh lens along the optical axis.

5. The optical imaging system according to claim 1, wherein 1≤f/f12<1.3,
   where f is the effective focal length of the optical imaging system, and f12 is a combined focal length of the first lens and the second lens.

6. The optical imaging system according to claim 1, wherein −0.5≤f/f3<0,
   where f is the effective focal length of the optical imaging system, and f3 is an effective focal length of the third lens.

7. The optical imaging system according to claim 1, wherein |f/f$^4$|+|f/f$^5$|≤0.3,
   where f is the effective focal length of the optical imaging system, f4 is an effective focal length of the fourth lens, and f5 is an effective focal length of the fifth lens.

8. The optical imaging system according to claim 1, wherein $2<f/R1<3$,
where f is the effective focal length of the optical imaging system, and R1 is a radius of curvature of the object-side surface of the first lens.

9. The optical imaging system according to claim 1, wherein $1<R5/R6<2$,
where R5 is a radius of curvature of an object-side surface of the third lens, and R6 is a radius of curvature of an image-side surface of the third lens.

10. The optical imaging system according to claim 1, wherein $f/(EPD*ImgH)<0.5$ mm$^{-1}$,
where f is the effective focal length of the optical imaging system, EPD is an entrance pupil diameter of the optical imaging system, and ImgH is half of a diagonal length of an effective pixel area on an imaging plane of the optical imaging system.

11. The optical imaging system according to claim 1, wherein the optical imaging system further comprises a stop, and $0.7<SL/TTL\leq0.9$,
where SL is a distance along the optical axis from the stop to an imaging plane of the optical imaging system, and TTL is a distance along the optical axis from the object-side surface of the first lens to the imaging surface.

12. The optical imaging system according to claim 1, wherein $f6/CT6<5.0$,
where f6 is an effective focal length of the sixth lens, and CT6 is a center thickness of the sixth lens along the optical axis.

13. The optical imaging system according to claim 12, wherein $10*|R2-R3|/f<0.5$,
where R2 is a radius of curvature of an image-side surface of the first lens, R3 is a radius of curvature of an object-side surface of the second lens, and f is the effective focal length of the optical imaging system.

14. The optical imaging system according to claim 12, wherein $1\leq f/f12<1.3$,
where f is the effective focal length of the optical imaging system, and f12 is a combined focal length of the first lens and the second lens.

15. The optical imaging system according to claim 12, wherein $-0.5\leq f/f3<0$,
where f is the effective focal length of the optical imaging system, and f3 is an effective focal length of the third lens.

16. The optical imaging system according to claim 12, wherein $|f/f4|+|f/f5|\leq0.3$,
where f is the effective focal length of the optical imaging system, f4 is an effective focal length of the fourth lens, and f5 is an effective focal length of the fifth lens.

17. The optical imaging system according to claim 12, wherein $f/(EPD*ImgH)<0.5$ mm$^{-1}$,
where f is the effective focal length of the optical imaging system, EPD is an entrance pupil diameter of the optical imaging system, and ImgH is half of a diagonal length of an effective pixel area on an imaging plane of the optical imaging system.

\* \* \* \* \*